(12) United States Patent
Sivaprakasam

(10) Patent No.: US 6,785,513 B1
(45) Date of Patent: Aug. 31, 2004

(54) METHOD AND SYSTEM FOR CLUSTERED WIRELESS NETWORKS

(75) Inventor: Srinivas Sivaprakasam, Milpitas, CA (US)

(73) Assignee: Cowave Networks, Inc., Fremont, CA (US)

(*) Notice: Subject to any disclaimer, the term of this patent is extended or adjusted under 35 U.S.C. 154(b) by 638 days.

(21) Appl. No.: 09/828,349

(22) Filed: Apr. 5, 2001

(51) Int. Cl.$^7$ ............................ H04B 1/10; H04B 7/15; H04K 15/00
(52) U.S. Cl. ..................... 455/63.1; 455/11.1
(58) Field of Search .......................... 455/7, 11.1, 16, 455/19, 41.2, 63.1, 67.11, 67.13, 114.2, 295, 296, 423, 426.2, 445, 500, 501, 502, 503, 507; 370/315

(56) References Cited

U.S. PATENT DOCUMENTS

| | | | | |
|---|---|---|---|---|
| 4,434,505 A | * | 2/1984 | Gutleber ..................... | 455/501 |
| 4,759,051 A | | 7/1988 | Han ............................ | 379/59 |
| 5,509,028 A | * | 4/1996 | Marque-Pucheu .......... | 375/211 |
| 5,526,376 A | * | 6/1996 | Kellenberger et al. ...... | 375/211 |
| 5,850,593 A | * | 12/1998 | Uratani ....................... | 455/11.1 |
| 5,883,884 A | * | 3/1999 | Atkinson ..................... | 370/279 |
| 6,122,260 A | * | 9/2000 | Liu et al. ..................... | 370/280 |
| 6,128,276 A | | 10/2000 | Agee ............................ | 370/208 |
| 6,353,729 B1 | * | 3/2002 | Bassirat ...................... | 455/11.1 |
| 6,690,657 B1 | * | 2/2004 | Lau et al. ..................... | 370/315 |
| 2001/0012776 A1 | * | 8/2001 | Chandler et al. ........... | 455/435 |
| 2001/0024955 A1 | * | 9/2001 | Schloemer .................. | 455/445 |
| 2002/0086691 A1 | * | 7/2002 | Kostic et al. ................ | 455/503 |

FOREIGN PATENT DOCUMENTS

| | | | | |
|---|---|---|---|---|
| GB | 2349045 A | 10/2000 | ............ | H04Q/7/36 |
| WO | WO97/11537 | 3/1997 | ............ | H04B/7/26 |

OTHER PUBLICATIONS

Swales S. C. et al: "Multi–Beam Adaptive base–station Antennas for Cellular Land mobile radio systems" Gateway to New Concepts in Vehicular Technology, san Francisco, May 1–3, 1989, Vehicular Technology Conference, New York, IEEE US vol. 1 Conf. 39, May 1, 1989, pp. 341–348, XP000076319.

Guo Y.J. et al.: "Advanced Base Station Technologies for Utran" Electronics and Communication Engineering Journal, Institution of Electrical Engineers, London, GB, vol. 12, No. 3, Jun. 2000, pp. 123–132, XP001038714 ISSN: 0954–0695.

* cited by examiner

*Primary Examiner*—Vivian Chin
*Assistant Examiner*—Raymond B. Persino

(57) ABSTRACT

A system and method for wireless broadband transmission in a scattering environment using a network of coherent repeaters. In one embodiment, the system comprises a number of groups of nodes. The nodes in a group are capable of broadcasting to each other and of beamforming to another group of nodes. A basestation broadcasts a number of signals at the same frequency and time. Each signal comprises a desired signal and multiple interference signals. The signals arrive at the nodes as co-channel interferers. The nodes are able to distinguish between the signals sent from each antenna of the basestation. Each of the nodes is further operable to transmit a repeated signal to a destination node such that the repeated signals collectively cancel out co-channel interference at the destination node. Therefore, the destination node receives a signal substantially free of co-channel interference.

34 Claims, 21 Drawing Sheets

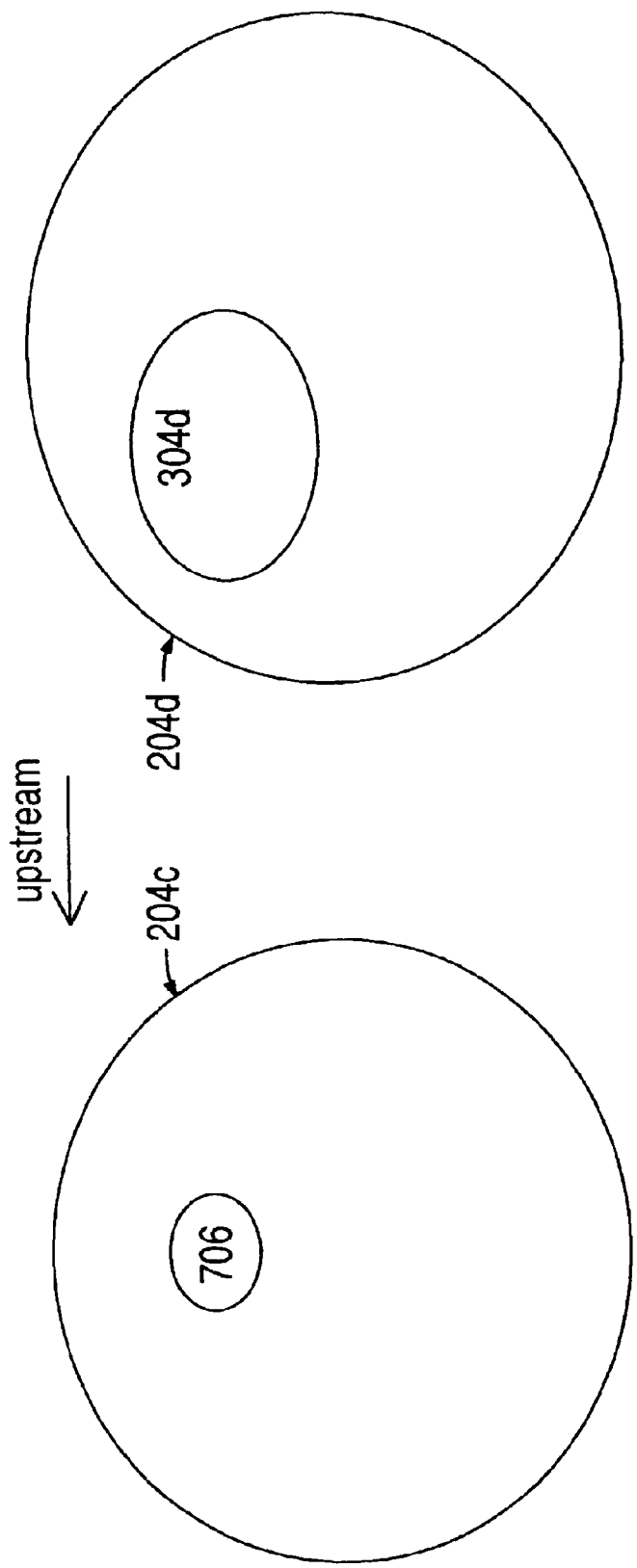

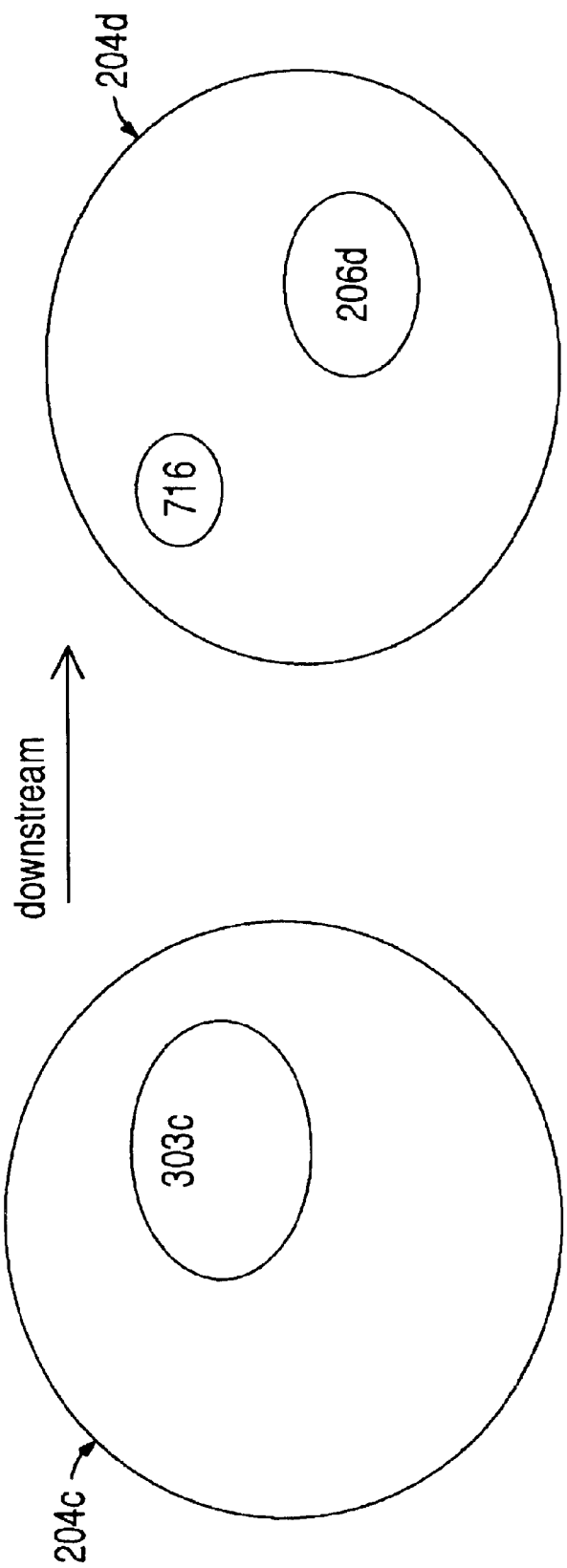

$\begin{pmatrix} s_1 \\ s_2 \end{pmatrix}$ Transmitted Signals $\begin{pmatrix} C_{11} & C_{12} \\ C_{01} & C_{02} \end{pmatrix}$ Channel Parameters $\begin{pmatrix} d_1 \\ d_2 \end{pmatrix}$ Desired Signals Therefore $\begin{pmatrix} d_1 \\ d_2 \end{pmatrix} = \begin{pmatrix} C_{11} & C_{12} \\ C_{21} & C_{22} \end{pmatrix} \begin{pmatrix} s_1 \\ s_2 \end{pmatrix}$ Estimate: $\begin{pmatrix} \hat{s}_1 \\ s_2 \end{pmatrix}$ From $\begin{pmatrix} d_1 \\ d_2 \end{pmatrix}$ Estimate: $C^{-1} = \hat{C}^{-1}$ $\begin{pmatrix} d_1 \\ d_2 \end{pmatrix} = C\hat{C}^{-1} \begin{pmatrix} s_1 \\ s_2 \end{pmatrix} \simeq \begin{pmatrix} s_1 \\ s_2 \end{pmatrix}$ Basestation transmits $\hat{C}^{-1} \begin{pmatrix} s_1 \\ s_2 \end{pmatrix}$

Fig. 13

METHOD AND SYSTEM FOR CLUSTERED WIRELESS NETWORKS

TECHNICAL FIELD

The present invention generally pertains to the field of wireless broadband communication. More particularly, the present invention is related to a method and system for wireless broadband communication using clustered networks of receivers/transmitters which coherently repeat a signal to a downstream receiver.

BACKGROUND ART

Wireless communication systems are requiring ever-increasing bandwidths. This is due to an increase in both the number of customers and the proliferation of high bit rate services. Consequently, vendors such as Internet service providers require higher capacity networks to meet consumer demand for faster service. Frequently, such services are provided in urban areas. However, wireless transmission in such an environment may present problems.

One conventional method of wireless transmission of a signal is far field beam forming. In this conventional system, the base station has a phased array antenna. It is possible to transmit to multiple users on the same frequency and at the same time by placing the nulls correctly. For example, the transmission is sent such that the null of one user's signal appears at the peak of another user's signal.

That system works acceptably in a free space environment. However, in a scattering environment it is difficult to maintain a coherent beam. Therefore, this conventional system does not work well in urban environments where buildings scatter the transmitted signal and force the signal into multiple paths.

Another conventional system uses multiple transmitters located around the destination receiver, for example, to the north, south, east, and west. The destination receiver has multiple antennas which may be used to select the desired signal or reject an undesired (interference) signal. For example, two antennas may be used to combine a signal coming from the east with one coming from the south. Alternatively, one antenna is used to receive the desired signal, while another rejects an undesired signal. Unfortunately, this system requires that each receiver have multiple antennas. Furthermore, to be able to selectively reject a signal, a free-space environment is needed. In a scattering environment, the undesired interference signal cannot be detected well enough to reject.

Still another problem is that certain nodes may be at a location for which reception is poor. For example, even though it is near the basestation, the node may be physically located near a wall which blocks reception.

Another problem of some conventional systems is that they are subject to selective frequency fading. For example, if an object such as a truck interferes with the signal, even though some frequencies get through, selective frequencies may fade. Consequently, signal reception is impaired.

Thus, a need has arisen for a method and system for wireless broadband communication suitable for a scattering environment. A still further need exists for a method and system not requiring multiple antennas per receiving station to receive a signal. An even further need exists for such a method and system which is scaleable and suitable for multiple users at high bit rates. A still further need exists for such a method and system which has better fading characteristics than conventional systems described above and can reach stations at poor reception sites.

SUMMARY

The present invention provides for a method and system suitable for wireless transmission in a scattering environment. The present invention does not require multiple antennas per receiving station to receive a signal. The present invention provides for a method and system which is scaleable and suitable for multiple users at high bit rates. The present invention has better fading characteristics than conventional systems and can reach stations at poor reception sites. The present invention minimizes selective frequency fading using spatial and frequency transmitter diversity.

A system and method for wireless broadband transmission in a scattering environment using a network of coherent repeaters is disclosed. In one embodiment, the system comprises groups of nodes. The nodes in a group are capable of broadcasting to each other and of beamforming to another group of nodes. First, a basestation broadcasts a number of signals at the same frequency and time. Each signal comprises a desired signal and multiple interference signals. The signals arrive at the nodes as co-channel interferers. However, the antennas of the basestation appear as a distributed source to the nodes in a group near the basestation. Therefore, the nodes are able to distinguish between the signals sent from each antenna of the basestation. Each of the nodes is further operable to transmit a coherent repeated signal to a destination node such that the repeated signals collectively cancel out co-channel interference at the destination node. Therefore, the destination node receives a signal substantially free of co-channel interference.

In another embodiment, each group of nodes is divided into sub-groups of nodes. This division is based upon their ability to receive a first signal from the transmitter at a higher power level or a significantly different phase than these nodes receive a second signal from said transmitter. One subgroup coherently repeats to one destination node and another subgroup coherently repeats to another destination node.

Each node may also repeat the signal on multiple frequencies that are separated far enough apart to substantially eliminate selective frequency fading. This may be useful during the initial state of the network when there may be insufficient nodes to cooperate effectively.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 7A is a diagram of how data that is flowing upstream is beamformed to a downstream facing node, according to an embodiment of the present invention.

FIG. 7B is a diagram of how data that is flowing downstream is beamformed to an upstream facing node, according to an embodiment of the present invention.

FIG. 13 illustrates calculations uses in estimating a pre-equalized signal to transmit, according to an embodiment of the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Method and System for Clustered Wireless Networks

The present invention comprises a distributed network of antennas which receive a signal and cooperate to re-transmit (repeat) the signal such that there is a coherent combining of desired signal and interference cancels out at a destination node. The present invention uses spatial re-use through interference rejection on the data channels. The present invention may be able to achieve non-line-of-sight transmission at 10 Mb/s or higher over several miles. In so doing, embodiments may hop a signal from one group of nodes to another (e.g., 5–10 hops), until the final destination node is reached.

Exemplary Receiving/Repeating Node

Figure 1A:
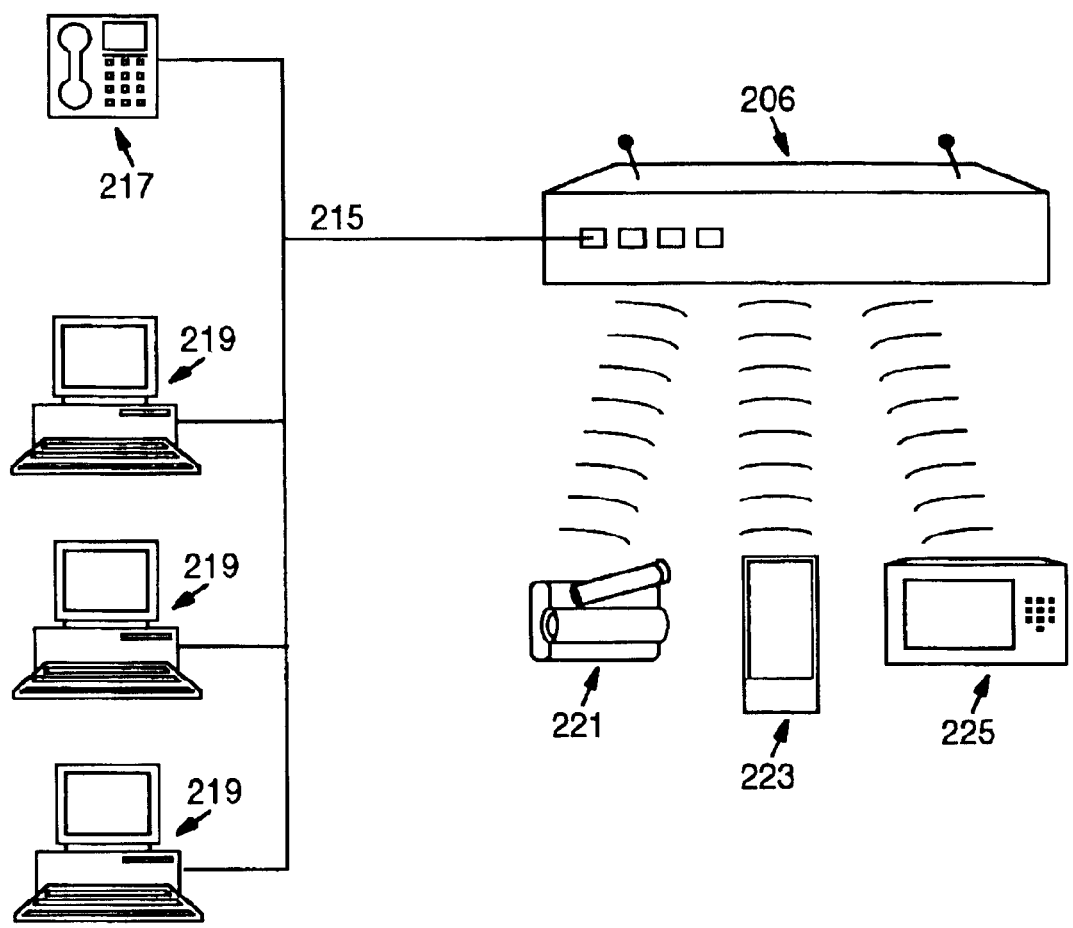
FIG. 1A is an illustration of a receiving/transmitting node connected to various devices, according to an embodiment of the present invention.

In one embodiment of the present invention the receiving/repeating nodes are implemented as Customer Premise Equipment (CPE) boxes. Referring to FIG. 1A, the CPE 206 may be connected to a telephone 217 or a personal computer 219 via Local Area Network (LAN) communication link 215, in one embodiment. The LAN communication link 215 may use, for example, a universal serial bus (USB), RS-232, IEEE 1394 (Firewire), RJ-45, 10Base-T, or the like. The CPE 206 may also interface with electronic devices, such as, for example, a video-recorder 221, a personal digital assistant (PDA) 223, a microwave 225, etc. The LAN communication link 215 may be wireless via, for example, IEEE 802.11, IEEE 802.15, Bluetooth, etc. The present invention is well-suited to other configurations, as well.

Figure 1B:
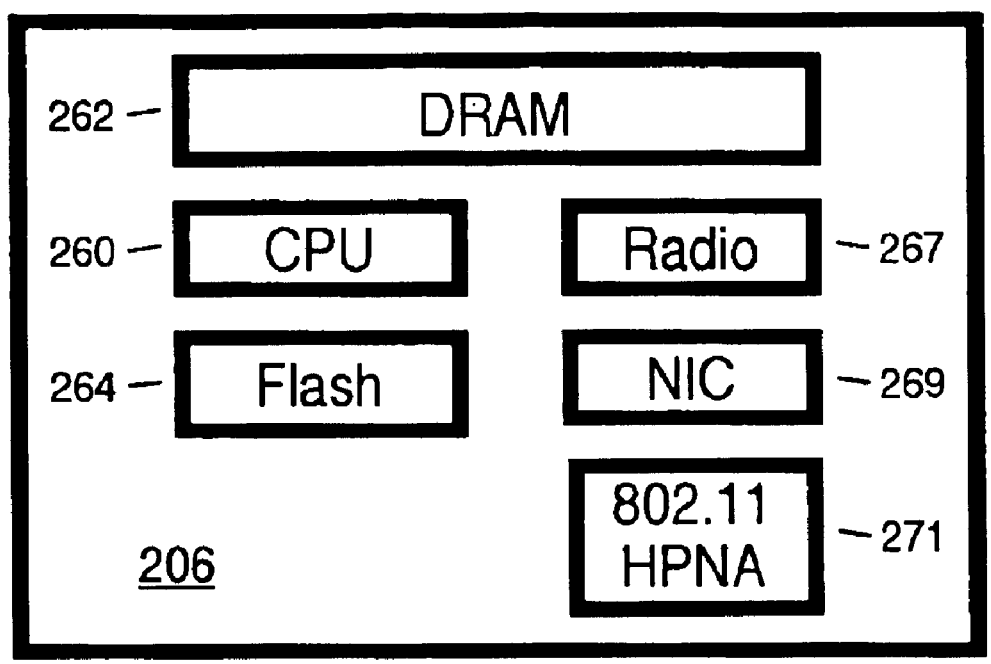
FIG. 1B is a high level block diagram of components of a receiving/transmitting node, according to an embodiment of the present invention.

Referring now to FIG. 1B, the CPE 206 comprises a central processing unit (CPU) 260, flash memory 264, dynamic RAM 262, a radio module 267, a network interface card (NIC) 269, and a wireless module 271 (e.g., IEEE 802.11).

Beamforming within a Distributed Network of Nodes

Figure 9:
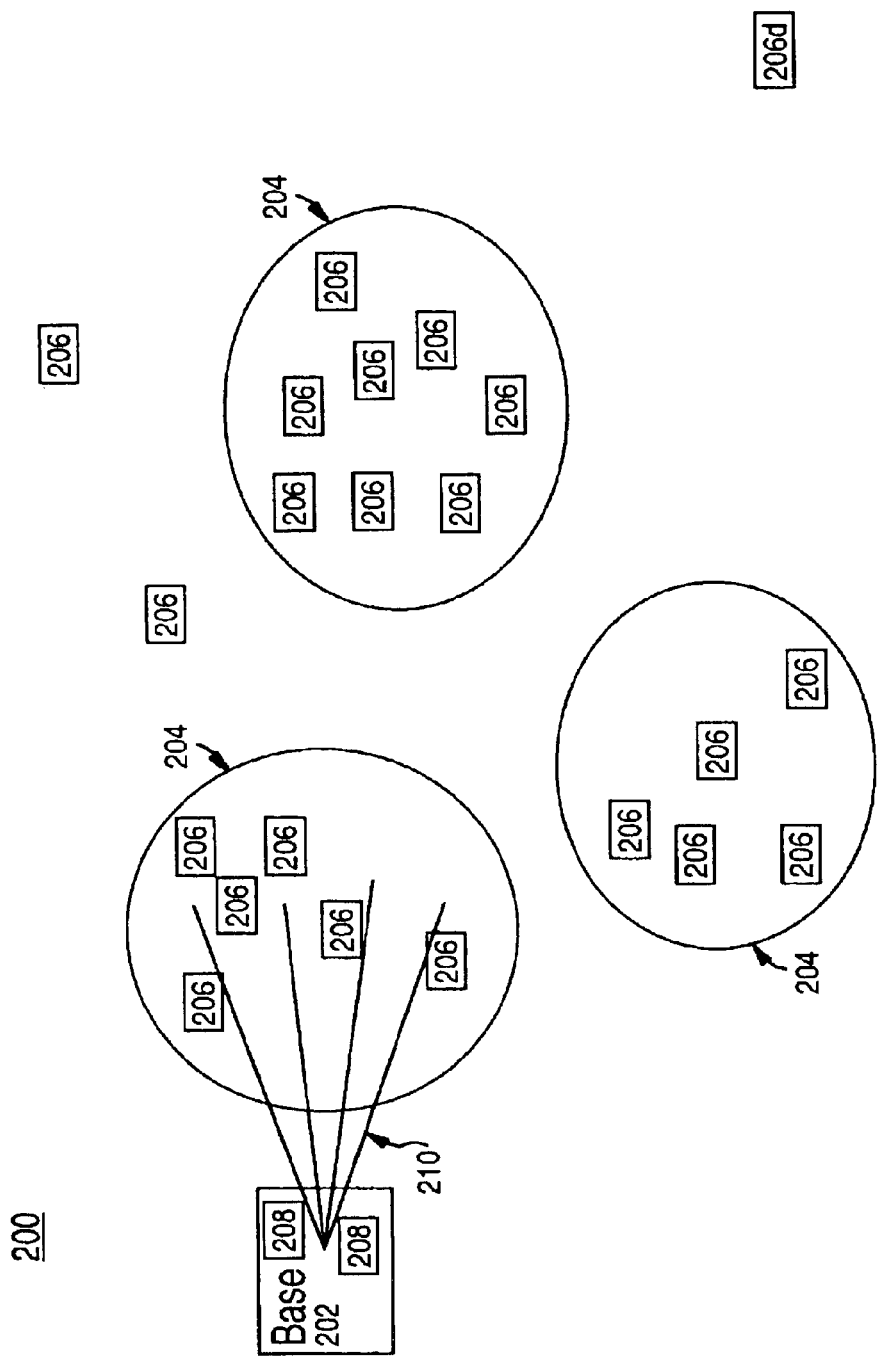
FIG. 9 is an exemplary network of groups of distributed nodes, according to an embodiment of the present invention.

FIG. 9 illustrates a overview of a network 200 of distributed nodes 206 (e.g., CPEs). The network 200 comprises a basestation 202 and a number of groups 204 of nodes 206. Throughout this application, the groups 204 may be referred to as picocells 204. The basestation 202, which comprises a number of transmitters 208, broadcasts signals 210 to nodes 206 in a picocell 204 near the basestation 202. The nodes 206 in a picocell 204 repeat a version of the signals 210 on to another picocell 204, which then sends the signals on to another picocell 204 until the signal arrives at the destination node 206d.

In one embodiment, the basestation 202 transmits signals 210 at the same frequency and at the same time. Consequently, when the signals 210 arrive at the first picocell 204, they are co-channel interferers. However, the basestation antennas 208 appear to the nodes 206 in the nearby picocells 204 as a distributed source. The spacing between the basestation antennas 208 relative to the distance to each of the nodes 206 in the nearby picocells 204 is such that each of the nodes 206 is able to distinguish between the transmitted signals 210. The phase and amplitude of each signal 210 will be differentiated at each node 206.

A node 206 may comprise an omni-directional transceiver with a receive and transmit antenna. However, it is not required that the node be omni-directional. In one embodiment, the nodes 206 receive and decode up to 10 Mbps for its own use and receive and transmit (repeat) up to 50 Mbps. In one embodiment, the system transmit signals between 1.9 GHz and 5.75 GHz. The average required bandwidth is 2.5 MHz and 12.5 MHz respectively for 10 Mbps and 50 Mbps signals.

Figure 10:
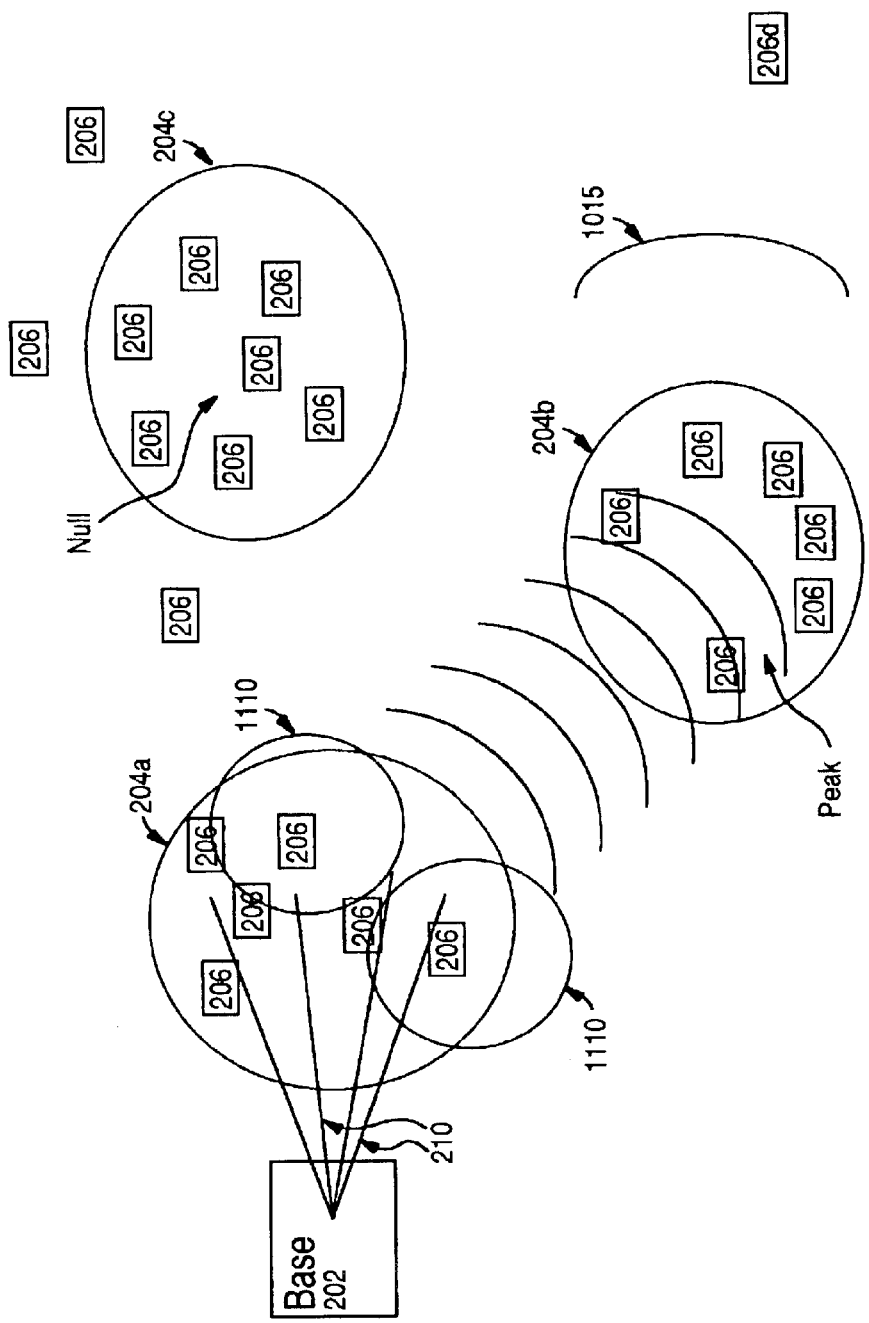
FIG. 10 illustrates one group of nodes repeating a signal to a second group of nodes, according to an embodiment of the present invention.

In one embodiment, a signal is hopped from one picocell 204 to another picocell 204 such that an adaptive beamformed link connects the two picocells 204. The beamforming may take place in the near field or in the far field. Referring now to FIG. 10, the nodes 206 in one picocell 204a each transmit a repeated signal 1110. For example, the first picocell 204a repeats coherently to the next picocell 204b. The nodes 206 in a nearby picocell 204b receive these repeated signals 1100 and, in turn, broadcast their own repeated signals. The signals from the second picocell 204b coherently combine to form a beam 1015 such that co-channel interference at the destination node 206d is collectively canceled out, and the desired signal adds coherently. The signal 1110 arrives at a peak at the master node of the second group 204a, and the signal 1015 arrives at a peak at the destination node 206d. By adding up the signals constructively at the destination node 206d, embodiments of the present invention effectively increase the power of the transmitted signals 210. Furthermore, the signals 1110 and 1015 have null at the master of group 204c. By nulling interfering sources, embodiments of the present invention effectively increase capacity by using resources more efficiently.

One embodiment transmits a signal to a destination node 206d several miles from the basestation 202 by hopping through multiple picocells 204, for example five to ten picocells 204.

Some nodes 206 may be in a position in which the received signal is somewhat weak. For example, the node 206 may be at a far distance from the basestation 202 or the node 206 may be near a wall although be near the basestation 202. Embodiments of the present invention can deliver a signal to this node 206 with substantial power gain. For example, ten antennas in a picocell 204 working cooperatively to coherently increase the signal amplitude can achieve a 20 dB power gain in the signal.

Multiple Streams in the Network

Figure 3:
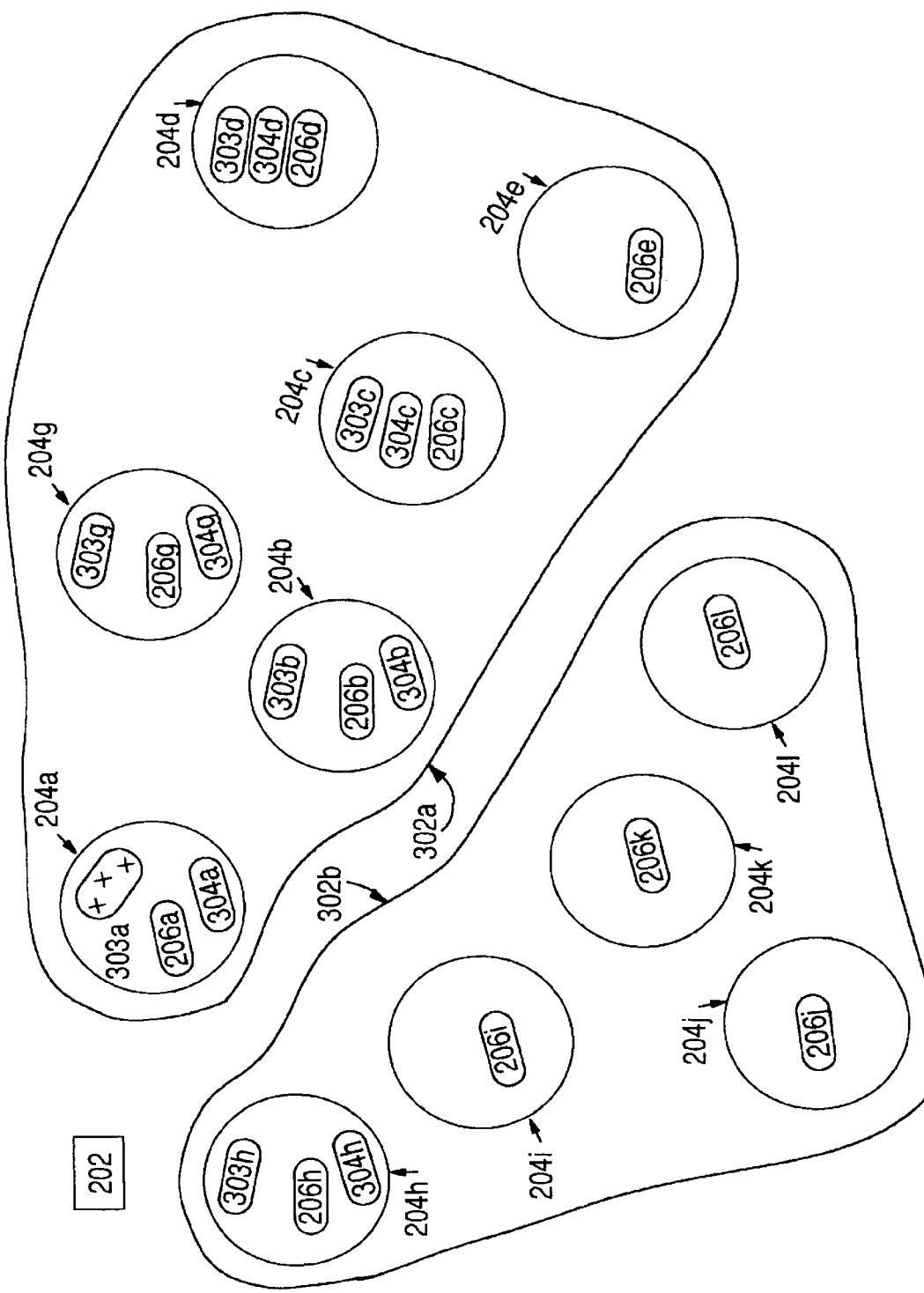
FIG. 3 is a diagram of network and showing groups of nodes formed into streams to deliver data, according to an embodiment of the present invention.

Referring now to FIG. 3, an embodiment in which multiple streams 302 exists will be discussed. The network has a number of groups 204 of nodes 206 which cooperatively beamform. Each group 204 has a master node, for example, nodes 206a–206l. The network 200 is organized into streams 302 radiating from a base station 202 hub (e.g., the base station 202 may be an Internet Access Point or IAP). The streams 302 have a fixed network topology and every node 206 in the network 200 has a fixed route to/from the IAP 202. A route through a stream 302 in the network pertains to the hops a data packet has to go through to get to its destination. The topology of a stream 302 is fairly static and changes only when new nodes 206 appear in a stream 302 or when nodes 206 disappear from a stream 302.

Still referring to FIG. 3, upstream and downstream data are simultaneously routed through the network 200 using different sets of frequency sub-carriers. Data packets hop from group 204 to group 204 to reach a destination node 206. Each node/group in the network 200 works in a half-duplex mode, i.e. each node/group can only transmit or receive at any instant in time. A data packet that needs to be sent from the IAP 202 to a node 206 in group 204c is first sent to the master node 206a in group 204a, then sent from node 206a to a down-stream beamforming group 303a of group 204a, then from the subset 303a to master node 206b of group 204b, which transmits to a down-stream repeating subset 303b of group 204b. Then, the down-stream beamforming group 303b transmit to the destination node 206. Similarly, a data packet from node 206 to the IAP 202 would be sent to an upstream repeating sub-set 304c of group 206c, then from upstream repeating sub-set 304c to master node 206b. Master node 206b transmits to upstream repeating sub-set 304b, which transmit to master node 206a. Master node 206a transmits to upstream repeating sub-set 304a, which transmit to the LAP 204. It is not required that there be only one master node per group 204. Furthermore, in a given picocell, one master node may control the upstream subgroup 304 and another master node may control the down-stream beamforming group 303.

In the preferred embodiment, to coordinate upstream and downstream traffic through the network with half-duplex nodes, each node/group in the receive mode is able to receive transmissions from other groups 204 (multiple) in upstream and downstream directions. Also nodes/groups are able to transmit in both upstream and downstream directions when neighboring groups 204 are in receive mode. This requires network-wide clock synchronization to assure that transmit and receive mode nodes/groups are properly synchronized.

Figure 4:
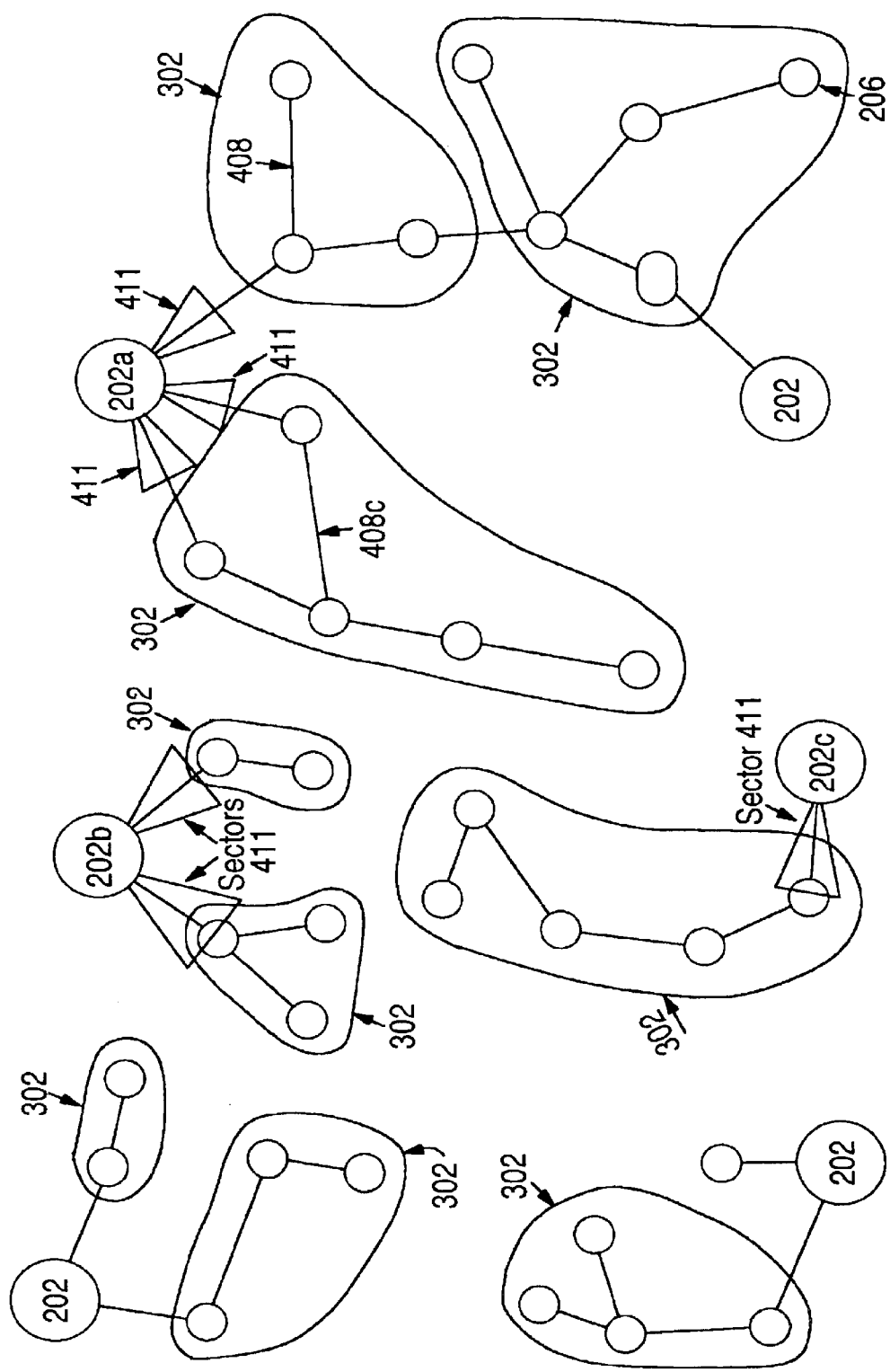
FIG. 4 is a diagram showing multiple base stations and multiple streams in which data flows, according to an embodiment of the present invention.

Referring now to FIG. 4, there could be several streams 302 that are disjoint and each have one backhaul connection through the IAP 202 as shown. The links 408 that connect groups 204 represent beamformed patterns. There is redundancy in coverage. For example, link 408c indicates a congested link around which the network 200 could find an alternative path. The base station hubs 202 can support single or multiple streams 302. For example, the IAP 202 has three sectors 411, LAP 202b has two sectors 411 and IAP 202c has one sector 411.

In the preferred embodiment, the various nodes 206 have their antennas facing a direction to facilitate efficient communication. For example, the upstream beamforming nodes 304 have nodes 206 with antennas directing to the LAP 202 or an upstream master. The down-stream beamforming group 303 have nodes 206 pointing to the downstream (next hop) master. Furthermore, the master nodes themselves face the opposite direction of the sub-group (303 or 304) that they control. Thus, the sub-group beamforms to the next hop master that decodes the signal to the MAC packet level (level 2 switching) and re-transmits to the nodes 206 in its sub-group. These sub-group members in turn beamform to the next master without decoding the signal. Thus, their channel fading profiles add incoherently, as does the noise.

In order to combat interference, there may be special nodes 206 in each group 204 whose specific function is to cancel the interference to group masters in the vicinity for which the signal is unintended. In one embodiment at least 5 to 6 nodes beamform and place the interference null at the unintended group master with approximately 30 nodes beamforming for a peak at the desired group master. In general with N beamforming nodes for the peak, it is desired to have sqrt(N) nodes for each interference null. In general the antenna directionality helps mitigate harmful interference to other nodes 206 of the network 200. The system gain achievable by this method including the beamforming gain, antenna gain and fade margin reduction (to a margin of zero) is of the order of 80 dB to 90 dB depending on whether 20 or 30 dB fade margins are required. While the network is shown as fixed nodes 206, the present invention is also suitable for mobile nodes 206, especially slow moving users and portable devices.

Base Station Description

Suitable frequencies for the base stations 202 to transmit include, PCS 1850 to 1910 MHz and 1930 to 1990 MHz, and the UNII 5.75 to 5.85 GHz band. However, the present invention is not limited these frequencies. In PCS bands, a base station 202 can utilize a sectored antenna or point to point approach. The choice may be affected by broadcast regulations.

Preferably, the operation of the base station radio is half duplex and controlled by a T/R switch (transmit/receive). This switch stays in a given position for two OFDM symbol durations at a time, thereby giving rise to a TTRR structure of time slot organization. This results in the latency through one hop being two time slots. Throughout this application, a pseudo time slot will mean two OFDM symbol durations, which require two actual time slots. However, the TTRR cycle of the base station radios might be changed to any desired concatenation of the cycles (e.g. TTTTTTRR, etc.).

Due to the half duplex nature of the network and the base station radio in particular, asymmetric bandwidth in the network (i.e. more downstream than upstream for example) may be achieved by having at least two groups 204 or two master nodes 206 connected to the same base station 202 antenna. Thus, the base station 202 can be in a completely transmit mode or completely receive mode or any combination thereof by alternating the transmit symbols to the two or more groups 204 connected.

Preferably, the base station antennas will be mounted at a 20 ft height or more and will have a clearing of the first Fresnel zone near the antenna (up to 100 m from antenna).

Base Station Interference Rejection

Each time a new base station 202 antenna and radio are turned into operation and hence a new stream 302 is formed, interference rejection matrix coefficients are re-computed based on a training sequence where each antenna and base station radio transmit a known control channel packet. All the first groups 204 including the newly formed one then report back the measured interference or desired signal strength to the base station 202. The control channel packet length is sufficiently long to allow for a narrow band filter to take out most of the noise and hence calibrate even small interference values (e.g. front to back antenna interference of 20 dB below carrier can be measured at the group master). Also the training procedure may be periodically repeated at a very slow rate to account for variations in HPA characteristics due to temperature variations and aging and other environmental conditions. These variations exhibit themselves as phase and amplitude changes and adjacent channel interference and other out of band interference. The training procedure will individually calculate the channel estimates for each sub band of 125 kHz. This corresponds to a maximum of 8 microseconds of delay spread. The channel estimate matrix will then be inverted and the interference rejection matrix will hence be computed. Once this matrix is computed, the coefficients are distributed/communicated to the interference rejection nodes 206 that specifically put a null at the base station antenna using these coefficients. In general, the interference rejection matrix computation is performed at the group master or any node that experiences harmful levels of interference while receiving their desired signal. The actual computation of the matrix can be done using a successive approximations method where by once the special nodes 206 cancel the first level or primary interference to the master node, the same nodes 206 then generate a second order interference to other master nodes 206 and so have to cancel interference from other special nodes 206 in a second order effect, and so on until a converged interference null is obtained.

Downstream and Upstream Signaling

Referring again to FIG. 3, signal traversal through the downstream occurs as follows, in the preferred embodiment. Data generated or collected at the base station 202 is modulated and signaled to the first downstream group master 206a at downstream pseudo time slot DT0 (as described herein, there are two OFDM symbols sent back to back). The master node 206a decodes the data packets to MAC layer and re-transmits to the local downstream beamforming nodes 303a in downstream pseudo time slot DT1. These nodes 303a do not attempt to decode the signal. In turn, they beamform to the next group master 206b during downstream pseudo time slot DT2. During DT2, the first master node 206a is in an idle state while the second master 206b is in receive state. Also master node 206a is in transmit state while master node 206b is in idle state. After the beamformed transmission is complete to master node 206b, downstream beamforming nodes 303a go into the idle state and the data gets decoded by master node 206b and re-transmitted in DT3 to downstream beamforming nodes 303. The process continues on further downstream. At each step of repeating, the repeated bandwidth successively keeps reducing since part of the bandwidth is used up for each group along the way.

Signal traversal through the upstream occurs as follows, in the preferred embodiment. Data generated at the last group (e.g., 304c) is sent to the upstream beamforming nodes 304c at upstream pseudo time slot UT0 (again this consists of two OFDM symbol durations). Note that the upstream pseudo time slots are not synchronized with the downstream pseudo time slots in the preferred embodiment. At UT1 these upstream beamforming nodes 304c beamform to the next upstream group master 206b in upstream pseudo time slot UT1. During UT2, group master 206b broadcasts the decoded and re-modulated contents to the second group of upstream beamforming nodes 304b, which then beamform during UT3 to group master 206a and the data traverses the upstream direction. In terms of idle slots, UT1 is group master's 206c idle slot, UT2 is upstream beamforming nodes' 304c idle slot, etc.

Communicating Downstream Data To Downstream Facing Nodes

When transmitting data to a node which is facing the downstream direction, an embodiment takes the following steps. These nodes 206 include the beamforming nodes (303, 304) as well as others. While the downstream facing nodes do receive a signal prior to their beamforming slots from the group master, unfortunately the signal may not be decodable due to lack of fade margin and diversity of transmitters. Also these nodes by their locations and antenna directionality face away from the previous downstream beamforming nodes 303a (or base station 202 as the case may be). Hence they cannot directly get the beamformed signal from the previous group 303. The downstream data gets to them in their idle slot as follows.

Figure 5:
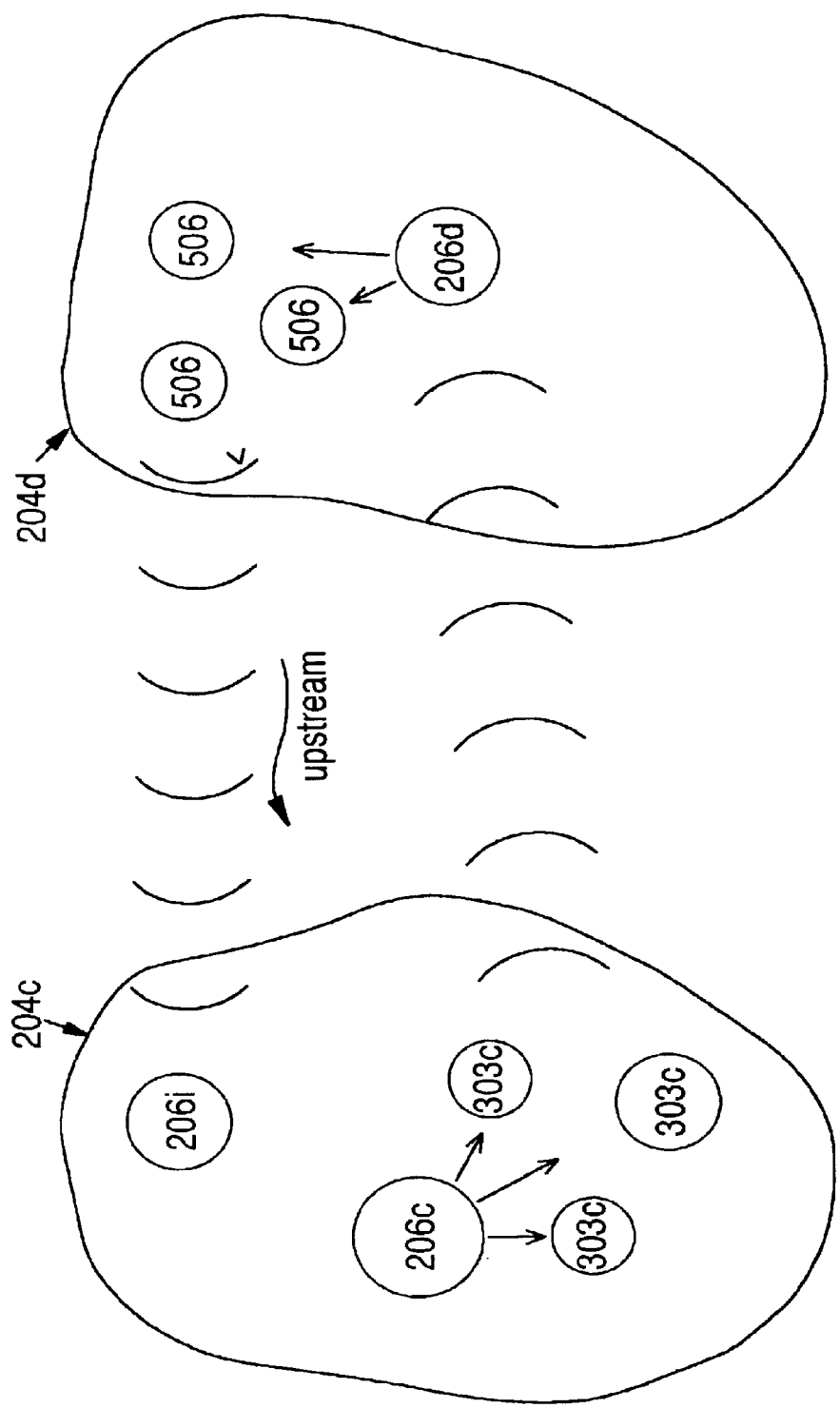
FIG. 5 is a diagram illustrating how data flowing downstream is beamformed to a downstream facing node, according to an embodiment of the present invention.

Referring now to FIG. 5, data is to be transferred from, for example, the base station 202 to node 206i, which may or may not belong to the repeating subset 303c. Because downstream beamforming nodes 303c face away from the previous downstream beamforming nodes 303b (not shown), they cannot reliably get the beamformed signal. Furthermore, the coded signal they receive from the master node 206c may not be decodable due to lack of fade margin and lack of transmitter diversity. Therefore, the signal is sent on to group 204d, and then back to node 206i in group 204c, as follows.

The data as well as other repeated downstream data gets to the group master 206c in pseudo time slot DT2 which then broadcasts it to the downstream beamforming nodes 303c during DT3. During DT4, the data is beamformed from downstream beamforming nodes 303c to master node 206d. During DT4, special control nodes 506 facing the upstream direction (up to three nodes, preferably two) that get good signal strength store the locally destined data including the data for node 206i. The control nodes 506 then beamform that data in the next slot DT5, which is the idle slot of 303c and in general of all the nodes 206 of the group 204c except master node 206c, which is in receive mode. The interference caused to master node 206c can be handled or analyzed in several ways. This interference is the desired signal for master node 206c in the previous receive slot DT2. Thus, conventional equalization techniques may be used to handle this interference. Furthermore, the level of interference can be very small by choice of master node. For example, since master node 206c faces the upstream direction, the interference it experienced from downstream may be relatively small. Finally, the three control nodes 506 can place a null at master node 206c while a peak at node 206i. As the multitap equalizer method is well understood in the art, it is the preferred approach. The beamformed signal is then decoded by node 206i and the data extracted.

Communication Upstream Data from Downstream Facing Nodes

Referring now to FIG. 7A, downstream facing nodes 706 have good visibility to the upstream beamforming nodes 304. For example, their antennas and windows may be facing each other. Hence, data that gets generated at the upstream beamforming nodes 304 can be sent to the downstream facing node 706 during the reserved upstream slot. However, due to unsynchronized timing of upstreams and downstreams, the actual transmission occurs during the transmit slot and the idle slot of the downstream node 706. Thus, the transmission might overlap these downstream pseudo time slots. The beginning of such a transmission occurs coincident with the group receive slot of the upstream where the resource was allocated.

Communicating Downstream Data to Upstream Facing Nodes

Referring now to FIG. 7B, the downstream beamforming nodes 303c transmit the downstream data intended for local upstream facing nodes 716 during their regular transmit cycle (they beamform those frequency bands and subcarriers to the desired upstream facing node 716 and not to the master node 206d further downstream). There is no overlap at the downstream pseudo time slots; however, there still will be overlap among the upstream receive and upstream idle slots.

Communicating Upstream Data from Upstream Facing Nodes

Here the control nodes 506 face downstream. The data flow occurs as follows. During the upstream beamforming nodes 304 idle slot, the data signal gets broadcast by the group master node 206c and received by the control nodes 506. Then, during the actual receive slot of the upstream beamforming nodes 304d these control nodes 506 also transmit the signal on the reserved carriers. The composite received signal then gets beamformed on the regular transmit cycle of group 204c to the node 206j.

Basic Time Slot Structure and Upstream/Downstream Correlation

As described herein, the pseudo time slot is composed of two OFDM symbol durations. Thus, a transmit slot implies two OFDM symbol transmissions back to back within the pseudo time slot. At the base station 202 the slots of downstream and upstream are synchronized. At the first group 204a, the upstream transmit slot and the downstream transmit slot are 2*F1 where F1 is the signal flight time from base station 202 to first group 204a. Effectively, the upstream starts 2*F1 earlier than downstream at the first group 204a. Time slots are refereed to the upstream beamforming pseudo time slot and downstream master node 206a receiving data from base station 202. Similarly from group i−1 to i the upstream slot and downstream slot at group i are 2*Fi more shifted than at i−1. Hence, the total maximum shift occurs at the last group (maximum number of hops from the base station 202) where it is given by 2*F1+2*F2+ . . . +2*Fn. The minimum shift is at the base station 202 where it is zero. There is some small deviation from this if one considers the propagation time delay between the group master nodes and the other nodes 206. However, this can be absorbed into the values of Fi so that Fi represents the sum of the flight delay to the previous group 204 and the average flight delay between the group master node (e.g., 206a) and other nodes 206. The variance about this average delay may be dealt with effectively by the prefix duration added.

The upstream and downstream pseudo time slots occur at relative time shift of zero at the base station 202. There are three slots that make up an event at the first group 204a and only one of them corresponds to the link to the base station 202. For instance, at the upstream group, the transmit cycle of the beamformer is the receive cycle of the base station 202. However, the other two cycles in the event correspond to moving data between group master node and beamformer and receiving by the group master node. Hence, the base station 202 is active and in receive mode only once in three slots. Similarly, it is in transmit mode corresponding to the receive cycle of the first downstream group master 204a only once as well in three slots. There is hence an idle slot at the base station 202 as well. This idle slot is dealt with effectively by the base station 202 either in transmit or receive cycle with another stream. Hence, with two streams (2 upstreams and 2 downstreams) the base station 202 can arbitrarily schedule asymmetric rates. The transmit, receive and idle slots of the base station 202 corresponding to the stream occur in the following order: TRI. Hence, the first group downstream slots occur as IRT. Also, the first group upstream slots occur as RTI. Equivalently, we can write the first group upstream slots as TIR and downstream slots as RTI and periodic repetitions of the events. This order of slots in an event is necessary as given because it allows for a total time shift of 2 OFDM symbol durations or about 574 microseconds between upstream and downstream slots while keeping the overlaps necessary for communications in some embodiments herein described. This corresponds to 287 microseconds of actual propagation delay, i.e. 54 miles, which should be sufficient in all cases of practical importance. However, the system is not limited to this number since if the actual propagated length increases beyond this, the nodes 206 will have to drop out of repeating when they have their own data communications. Hence each of the beamforming nodes would periodically drop out of the activity to serve their own communication link needs. This could be done by having an excess number of beamforming nodes such that when one node drops out, the others can make up for it by increasing their power outputs.

While most communications occur at regular local slot boundaries, there are some that overlap with idle slots. Specifically, this happens when downstream beamforming nodes 303 want to send upstream data that they generate. It also happens when upstream beamforming nodes 304 need downstream data from the IAP 202. Upstream slots arrangement order is RTI RTI RTI. Also, the corresponding downstream beamforming slots are arranged in order as IRT IRT IRT. When a downstream facing node needs to send upstream data, it transmits at a time that corresponds to the upstream R cycle. Since the downstream continuously slides to the right as one goes downstream from the base station, the upstream R cycle lies partly in the T and partly in the I cycle of the downstream. Hence the downstream facing node transmits its entire downstream beamformed signal as well as part of the upstream locally generated signal in its T slot and also sends the rest of the upstream data contiguously in the idle slot I. Similarly when upstream facing nodes need downstream data, the downstream nodes only transmit in their T cycle and beamform onto the upstream node requiring data (at lower power since the upstream node is nearby the beamforming downstream nodes). Since this T cycle partially overlaps the I and R cycles of upstream, the upstream node has to listen longer than its R cycle.

Choice of Modulation Scheme at Each Group Master

The group master in conjunction with the beamforming nodes can decide to use a higher or lower modulation scheme on the particular link as necessary. This improves the network capacity because the rest of the stream 302 is not captive to a noisy link between two groups 204. Also, using higher modulation schemes makes good use of link margins.

Group Formation

In one embodiment, one channel is used as a control channel. In order to form picocells 204, master nodes 206a send out a control signal on this channel, which the nodes 206 use to determine to which picocells 204 they belong. For example, a node 206 determines whether the received control signal is higher than a pre-determined threshold, and if so forms part of the picocell 204 with that master node 206a. A node 206 does not need to be a part of any picocell 204, however. After a picocell 204 has been formed, sub-groups 404 are formed within each picocell 204. These sub-groups 404 are used to repeat a signal to a destination node 206d. For example, two subgroups 404 have formed within the picocell 204.

Figure 12:
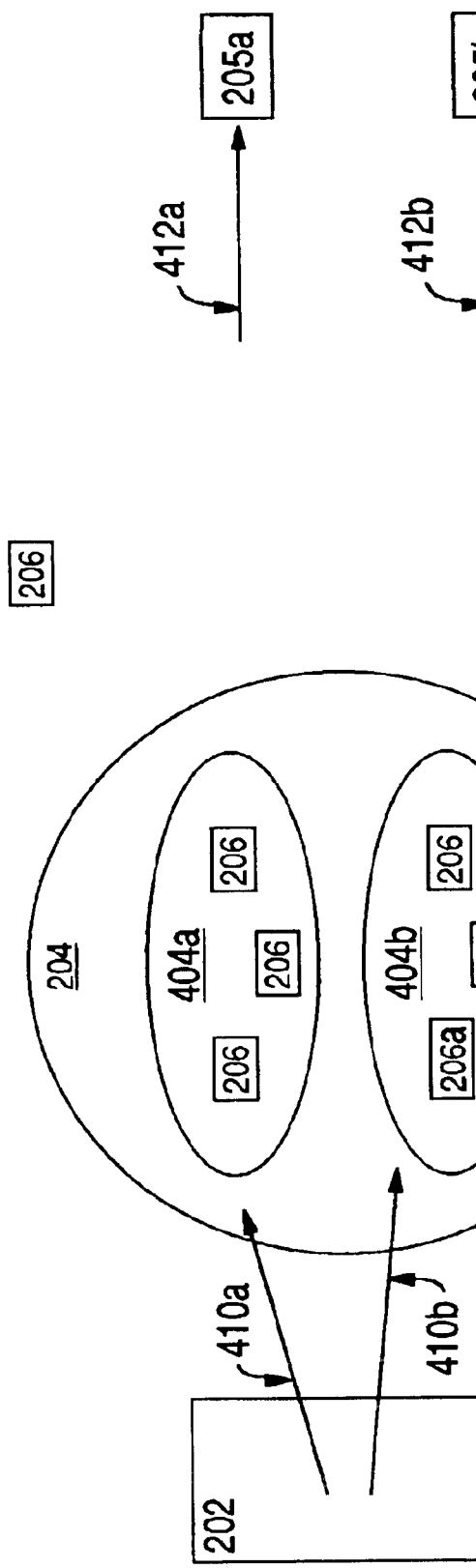
FIG. 12 is an illustration of group and sub-group formation, according to an embodiment of the present invention.

Referring to FIG. 12, subgroup 404 formation is as follows. The nodes 206 in subgroup 404a receive signal 410a with more power than they receive signal 410b. The nodes 206 in subgroup 404b receive signal 410b with more power than signal 410a. The nodes 206 in subgroup 404a coherently combine the signal for destination node 205a. Likewise, the nodes 206 in subgroup 404b coherently combine the signal for destination node 205b. Alternatively, the subgroups may be formed by nodes in one group (e.g., 404a) receiving a signal (e.g., 410a) at a significantly different phase than another signal (e.g., 410b).

Interference Rejection

Embodiments of the present invention also have an interference rejection algorithm, which runs at each node 206 in the network, as well as at the basestation transmitters 208. It is this interference rejection algorithm that allows embodiments of the present invention to transmit the desired signal substantially interference free at the destination node 206d, for example, without co-channel interference.

Referring to FIG. 12, the base station 202 is transmitting two separate signals 410a, 410b to two separate destination nodes 205a, 205b. The signals 410a, 410b which the base station 202 sends are pre-equalized. For example, actual transmitted signal 410a may be the desired signal minus a function of the interfering signal. The subgroups (404a, 404b) broadcast signals which coherently combine at the destination nodes 205. In one embodiment, the subgroup 404a nodes may reject some of the 404b signal.

The preferred signaling scheme in network 200 is OFDM and all control channel signaling is performed within this framework. Channel estimation is done on two links separately. These are the many to one beamforming link where the CPEs beamform to the next master and the one to many broadcast link where the master broadcasts the signal to its local group. Using a single OFDM symbol in a frame, channel estimates may be made using orthogonal frequencies for the pilot signals. Thus, if there are four groups in a repeater network configuration in a given direction (upstream or downstream), and if there are 128 subcarriers in a frequency band for OFDM, then there are 8 channel estimation pilot tone bursts that are needed for completely keeping them orthogonal. Thus there are 16 (128/8) frequency subcarriers that can be used for each of the link channel estimation algorithms. The actual channel estimate is derived from observing the phase and amplitude of the received pilot burst by the corresponding receiver(s). Because the reference signal is known, (0 or 1 modulating the single subcarrier that is used), by appropriate filtering a good channel estimate is obtained. Since this is a fixed network (portable or slow moving is also feasible) the initial estimation can be done over several frames to obtain a relatively noise free estimate. The channel estimate is then used in the equalizer, which then updates it adaptively with each received OFDM data symbol. A similar technique can be used to estimate the channel for the link between a data generating CPE and its group and between a group and a data recipient CPE.

In the repeater network, using the same frequency and time slot between distinct pairs of groups 204 in the same stream 302 causes echoes which can be equalized at the receiver node 206 (group master or end recipient CPE or base station 202). Typically with a loss of over 40 dB per decade in suburban areas, the signal drops down to less than noise floor for 16 QAM demodulation if the distance increases four-fold. However, this can cause at least one echo that can be significant as shown in the FIG. 17.

Figure 17:
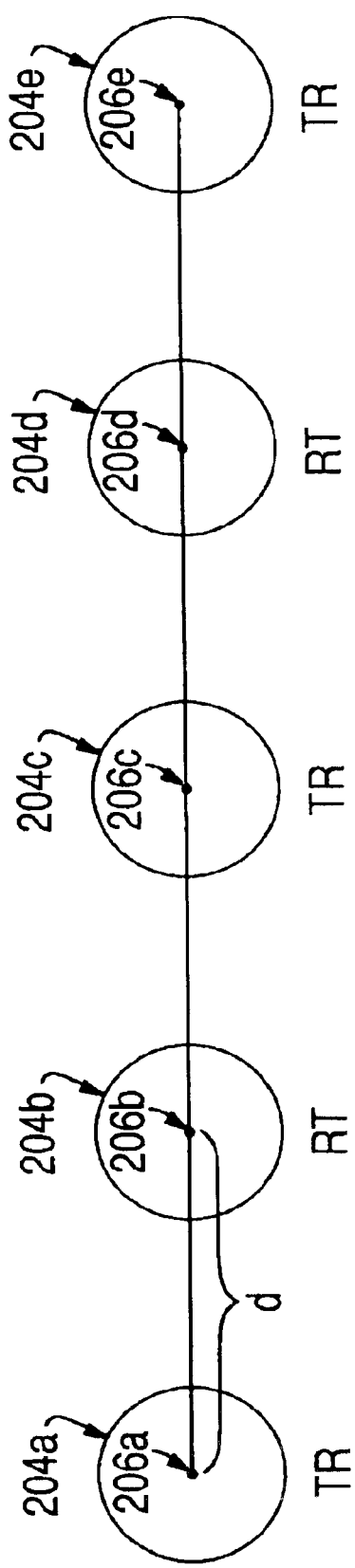
FIG. 17 is a diagram showing interference at a node from a signal intended for another node, which embodiments of the present invention substantially eliminate.

FIG. 17 shows five groups, 204a–204e, along with their Transmit and Receive cycles shown as T and R respectively. If the distance between any two master nodes (e.g., 206a and 206b) (or groups 204) is d as shown in FIG. 17, the signal from group 204a to group 204b is heard at group 204d and at a discernible level. This is the intersymbol interference that the equalizer will have to deal with effectively. For example, the level of the interference may be 18.8 dB (40*log10(3d/d)) without any beamforming. The beamforming may cause an additional 10 dB reduction (with 10 repeating nodes 206, the level of peak to an incoherent signal addition is a factor of 10) then the interference is almost 30 dB below the main signal, and hence is quite small. The preferred approach is to equalize this echo. The same control OFDM symbol is used for frame and symbol timing/frequency synchronization. This saves additional bandwidth from being used up by the control channel signaling.

The pre-equalized signal 410 may be calculated as illustrated by the matrix algebra in FIG. 13. The signals d1 and d2 are the signals desired by the destination nodes (205a, 205b). The signals s1 and s2 are the pre-equalized signals which the base station 202 transmits. The matrix C represents the channel parameters. The channel parameters are estimated and the base station 202 performs the calculation, as shown in FIG. 13, to form the pre-equalized signal 410.

In order to make the estimation, it is necessary for the matrix C in FIG. 13 to be invertible. This condition is satisfied by forming groups 404a and 404b whose nodes 206 receive one signal 410a stronger than the other signal 410b and vice versa. Alternatively, this may be achieved by forming groups 404 whose nodes 206 receive one signal 410a at a significantly different phase than another signal 410b and vice versa.

In order to achieve the maximum possible gain at the destination node 206d, the signal which is sent by each node 206 (repeater), when received by the destination node 206d would be exactly in phase. However, in order to save control channel resources, an embodiment of the present invention allows there to be a small phase variation in the received signals. For example, one embodiment keeps all the received signals within a 90 degree window. This may result in an approximately 3 dB signal loss; however this is acceptable considering that 10 nodes 206 repeating a signal coherently can achieve a 20 dB gain. Thus, this embodiment still may provide for a 17 dB gain at the destination node 206d.

Figure 14:
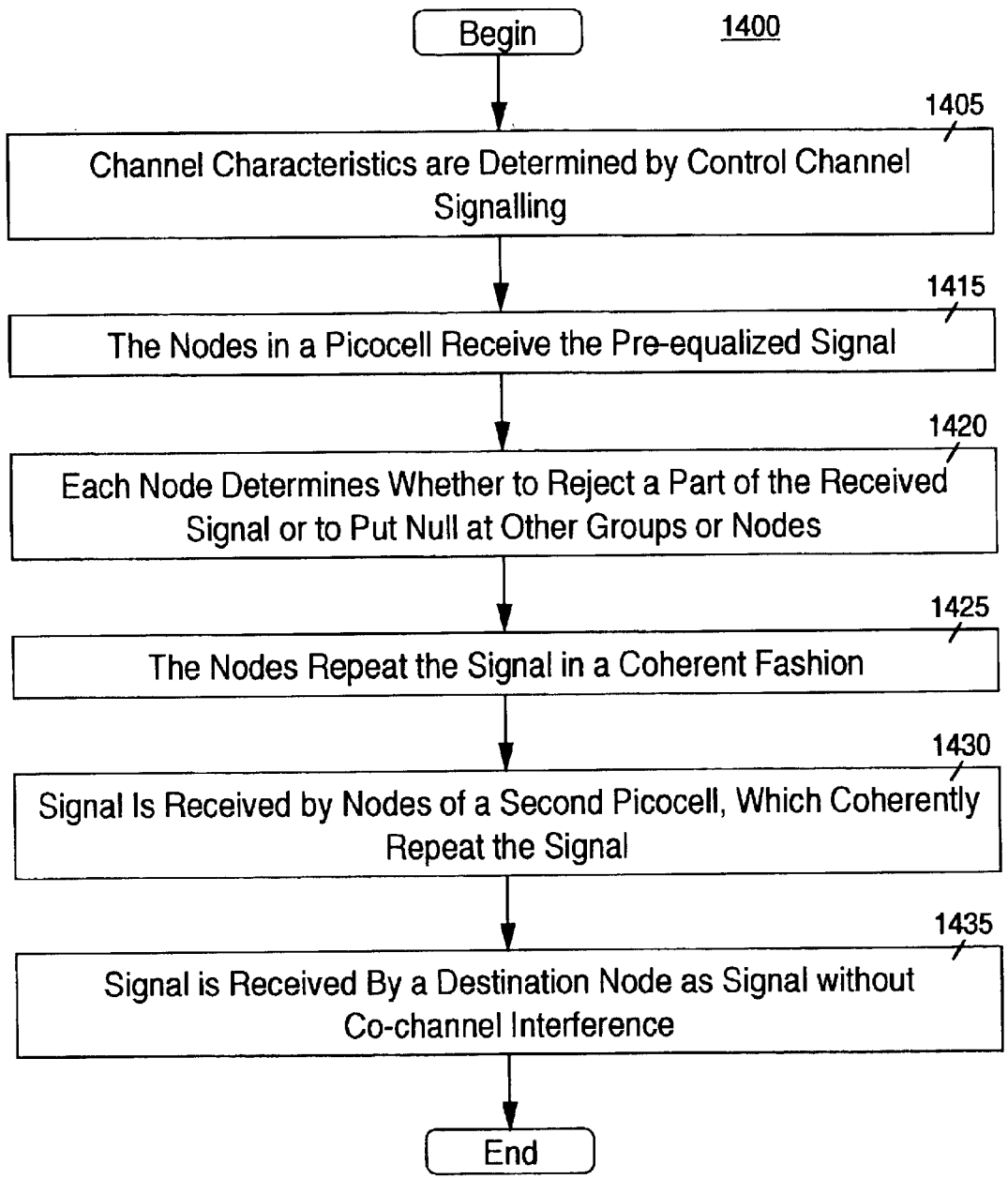
FIG. 14 is a flowchart illustrating the steps of a process of transmitting a wireless signal, according to an embodiment of the present invention.

FIG. 14 illustrates a flowchart of the steps of a process 1400 of transmitting a signal in a distributed group of nodes, using spatial division. In step 1405, the channel characteristics are determined. These characteristics may be determined, in one embodiment, by the use of control channel signals.

In step 1415, the signals from the base station 204 are received by the nodes 206 of a nearby picocell 204. When received, the signals will be co-channel interferers. The nodes 206 within a picocell 204 may be further divided into subgroups 404.

In step 1420, each node 206 determines whether to reject a part of the received signal. For example, a node 206 may reject a part of the interfering signal. Alternatively, the nodes 206 may put a null at other groups 204 or at a selected node 206.

In step 1425, the nodes 206 in the picocell 204 repeat the signal in a coherent fashion to a second picocell 204. In so doing, an adaptive beamformed link connects the two picocells 204.

In step 1430, the nodes of the second picocell 204 receive the signal. The signal may be hopped from one picocell 204 to the next multiple times. The nodes of the second picocell 204 then repeat the signal in a coherent fashion downstream.

In step 1435, the desired signal is received at the destination node 206d without co-channel interference. The interfering signals are substantially canceled by using the interference rejection algorithm of an embodiment of the present invention.

Figure 11A:
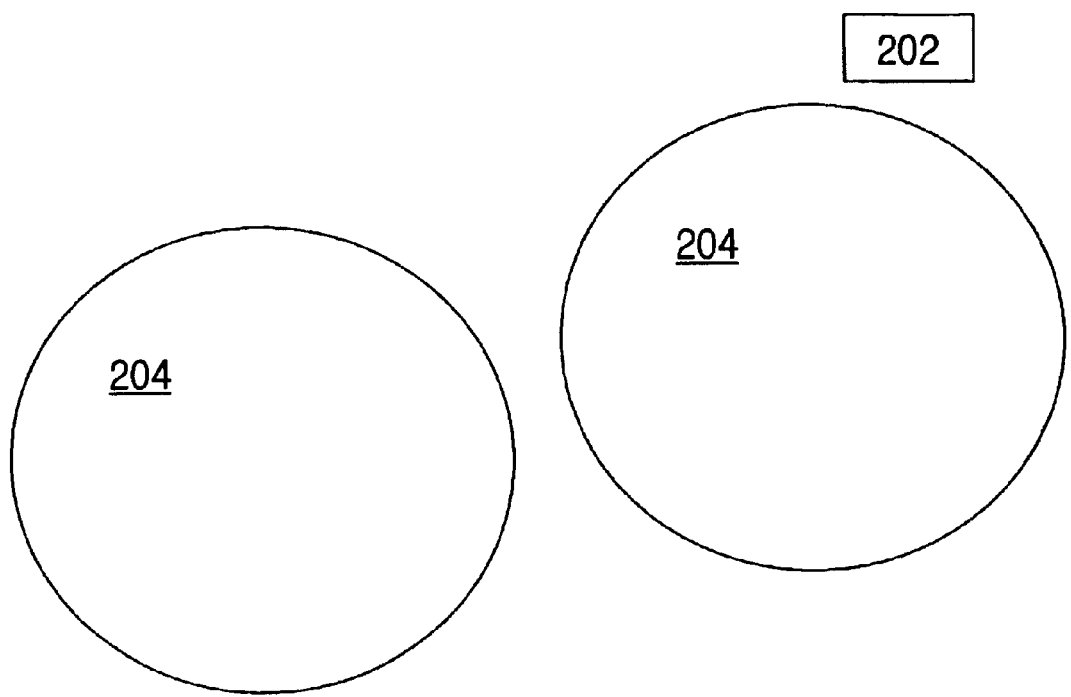
FIG. 11A and FIG. 11B are diagrams that illustrate the improvement in performance as the network adds more nodes, according to an embodiment of the present invention.
Figure 11B:
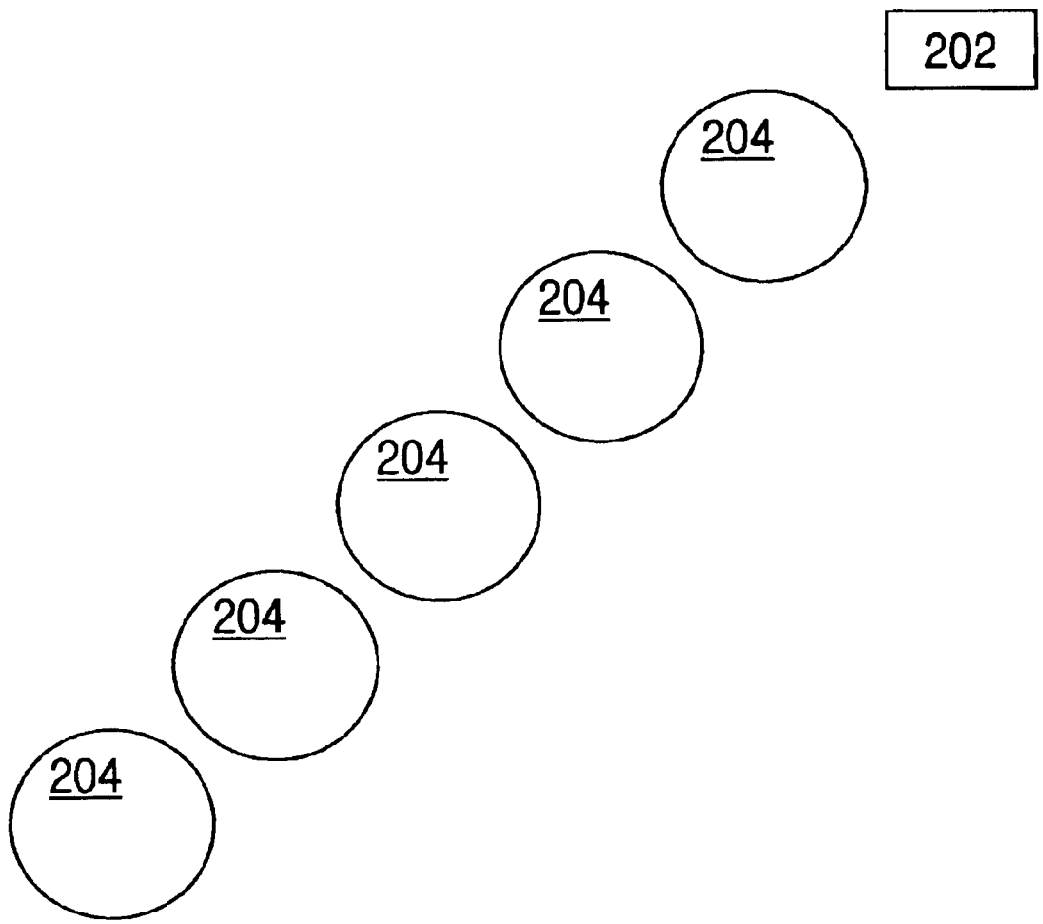

FIG. 11A and FIG. 11B illustrate an example of how the system is adaptable to various number of nodes 206 within the network. As the number of nodes 206 increases in the network 200, more dynamic picocells 204 get created. The existing groups 204 might split or new groups 204 might form and thus give rise to the additional picocellular 204 structure. Therefore, the range of signaling goes down since the average distance between groups or picocells 204 is reduced. Thus, it takes fewer nodes 206 to beamform to create a coherent peak at the next master node since less signal power is needed. This also leaves more nodes 206 in groups that can place nulls onto adjacent group master nodes. Thus, interference can be reduced and the network 200 can still maintain a high degree of frequency reuse. Coverage increases and becomes more uniform since there is a higher geographical density of nodes 206 and hence the repeater operation of the network 200 can provide a more uniform high data rate coverage.

During the initial state of the network, such as in FIG. 11A, when there may be insufficient nodes 206 to cooperate effectively, each node 206 may repeat the signal on multiple frequencies that are separated far enough apart to substantially eliminate selective frequency fading.

CPE Baseband Design

Figure 2A:
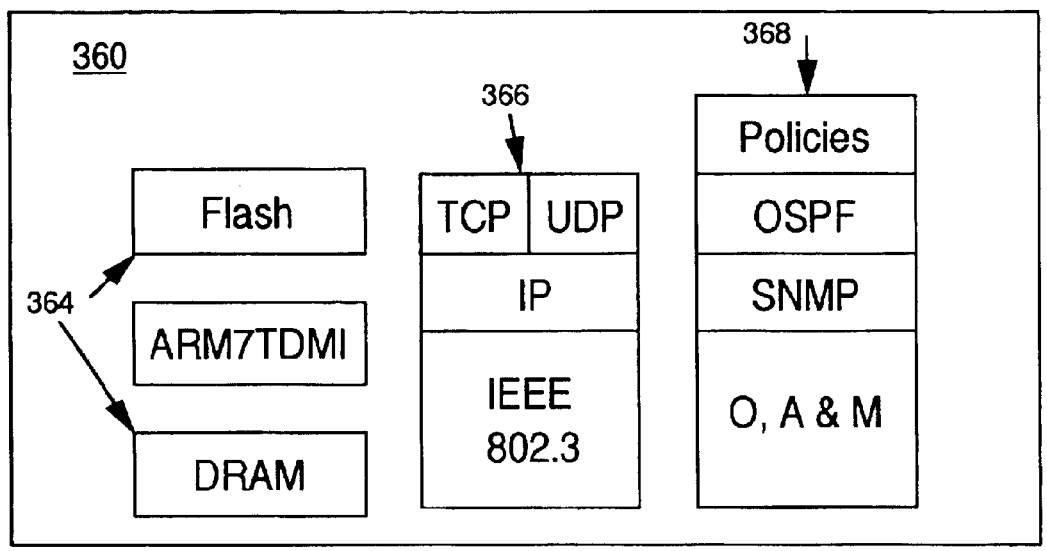
FIG. 2A is a block diagram of components of a receiving/transmitting node illustrating, according to an embodiment of the present invention.

The baseband design includes physical and logical channelization description, modulation and demodulation, equalization, codec description, signal quality estimation and the baseband beamforming and adaptive DSP algorithms. The overall baseband block diagram and its interface/relationship with the rest of the CPE box 206 is shown in FIG. 2A. The CPE box 206 contains a processor 360 which itself contains memory 364, TCP/IP/IEEE 802.3 software stacks 366, and Quality of Service and Service Level Agreement (SLA) logic 368.

Figure 2B:
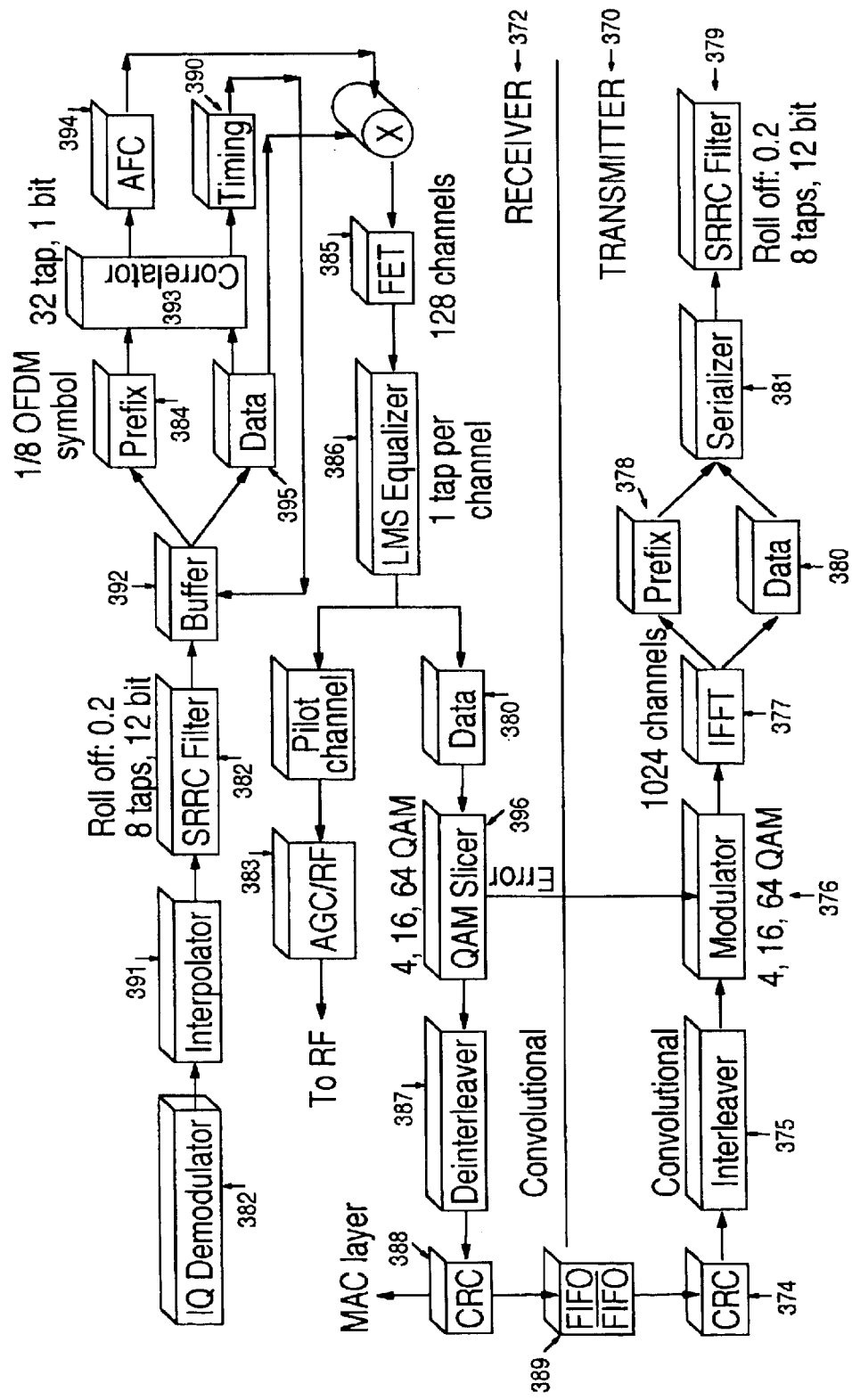
FIG. 2B is a block diagram of the baseband design of a receiving/transmitting node, according to an embodiment of the present invention.

Referring now to FIG. 2B, the baseband block of the CPE 206 comprises a transmitter 370 and a receiver 372. The transmitter 370 comprises a FIFO and interface 373 from MAC processor; a transmitter signaling with RF and IF circuits (not shown); clocks, counters and timing (not shown); CRC coding 374; encryption (not shown); interleaving 375; modulation and coding 376; inverse FFT processing 377; prefix addition 378; pre-distortion for amplifier non linearity (not shown); I/Q modulation and DC compensation (not shown); transmit filtering 379; and serializer 381. Data 380 is input to the serializer 381.

Still referring to FIG. 2B, the receiver 372 comprises: I/Q demodulation and DC compensation 382; receive filtering 382; timing 390; automatic gain control 383; prefix removal 384; FFT processing 385; adaptive equalization 386; de-interleaving 387; CRC decoding 388; FIFO and interface 389 to MAC processor; interpolator 391; buffer 392; correlator 393; AFC 394; QAM slicer 396. Data 380 is input to the QAM slicer 396.

Transmitter Signaling with RF and IF Circuits

The transmitter section 370 interfaces with the analog portion (RF and IF) through the D/A converter, PLL control signal, variable gain amplifier control signal, tuning PLL control signal and loop back test signals. ps Modulation and Coding Modulation used for each data channel may be QPSK, 16 or 64 QAM, or the like. The choice of modulation depends on the channel conditions as estimated in the previous reception by the destination node. At first transmission, the modulation used is 16 QAM. A heuristic algorithm may be used to allow the modulation to go to 64 QAM if channel conditions are good. If channel conditions are not favorable then the modulation drops to QPSK. In one embodiment, the algorithm uses an estimate of the channel over a sufficiently long period before changing the order, such that only narrowband processes in the channel are tracked and adapted to.

Trellis Coded Modulation will be used, in one embodiment. The convolutional code used will be (2,1,7) punctured to ⅞ or ¾. In order to flush the shift register, a variable number of tail bits must be used. The number of such bits is deterministic and equals the packet size in bits that goes through the encoder modulo 8 (e.g., is the remainder of the division by 8). The number of bits that go through the encoder is determined by the modulation order (16 or 64 QAM).

The convolutional code used in the modulation process is rate ½ and constraint length 7 and is further punctured to be a rate ⅞ or ¾. Generator polynomials for the code are in octal represented by:

$$g_0 = (1,3,3)$$

$$g_1 = (1,7,1)$$

The network is designed to support short as well as long IP packets ranging from 16 bytes to 1528 bytes payload. Different coding requirements exist for short and long packets. Hence the coding arrangements also are different for various packet sizes. In general coding is performed at 4 levels which include 2 CRC and 2 FEC codes. The first set of codecs work at the MAC layer on the complete IP packet that is long. These include a standard 32 bit CRC (CRC-32)

and the DVB standard (205,188,8) shortened Reed Solomon codec RS-204 which is done on blocks of 188 bytes. The second set of codecs work on the MAC packet at PHY layer. These are the 16 bit CRC (CRC-16) and the punctured convolutional (2,1,7) 7/8 codec (CC-217) with puncture pattern as defined earlier. In another embodiment the CRC are 24 bits. The latter codec works in conjunction with Trellis Coded Modulation to give a 3 dB coding gain approximately.

Several combinations of these codecs are used in the system depending on the packet lengths. For very short packets that are transmitted as a single MAC packet, RS-204 is not used and neither is CRC-16. For not so short packets (e.g., 205 bytes or larger) but still get transmitted as a single MAC packet in a single transmission, RS-204 is used. For larger IP packets (e.g., larger than the above packets but smaller than 64 Kbytes), all four codecs are used. The governing factor in the determination of the codec combination to be used is the effectiveness of such codecs. With good reason these should operate at their operating points to provide the coding gains (or error detection capability) associated with them. The reason for such an arrangement of codecs can be seen in the examples provided below. It will be understood that the present invention is well-suited to using other combinations of codecs and that those listed are exemplary.

First take the case of all four codecs being used. Assume that the raw BER in the PHY layer is $10^{-2}$ and that the 3 dB coding gain of TCM and CC-217 results in the PHY BER to be $10^{-4}$. For a 10,000 bit MAC packet that could be transmitted in a single time slot, this translates to a packet error probability of 1. For a 65536 byte IP packet, there will be about 53 such MAC packets and thus 53 or more errors are expected. Since RS-204 has can correct up to 8 errors in a block, with high probability all errors will get corrected at the MAC layer through its use. In this case, in fact one does not need the CRC-16 error detection implemented. In general CRC-16 is effective only when there is a burst or errors in a single packet that cause more errors than the RS-204 correction capability. Note that there is an interleaver between the PHY and RS-204 codec thereby spreading the errors in a single packet over multiple RS-204 blocks. If the errors are uniformly spread (best case scenario) over 16 blocks, then a single error burst can cause up to 128 bits in error—about 32 channels using 16-QAM and 64 channels using QPSK over OFDM. This amounts to a coherence time of 21 micro-seconds or 42 micro-seconds respectively which is sufficiently fast compared to any physically realistic channel. Even in these kind of channels, re-transmits can be performed only on the single packet that had the error burst event. Thus the RS-204 code does provide a powerful error correction method for sufficiently large packets.

As a second example consider a 16 byte IP packet which with the IP header becomes 36 bytes long. Clearly RS-204 cannot be performed in a meaningful manner (too much shortened). CRC-32 provides for error detection of about 99.999999977% or only $2.33 \times 10^{-8}$% errors go undetected. If we use the same PHY BER of $10^{-4}$ after TCM and CC-217, then one out of 28 packets will be in error on average. Thus, for such short packets, extra power is needed so that the BER and hence FER is significantly lower than 1/28. A 2 dB power increase would be sufficient to reduce the BER from $10^{-4}$ o $10^{-6}$ for 16 QAM. This would make the FER 1/2800 approximately which is much more reasonable. In general in all cases where RS-204 is not used, the link budget should provide for 2 dB extra power to account for the coding gain that would otherwise exist.

Inverse FFT Processing

A 128 point FFT (and inverse FFT) algorithm is used in the baseband 302. It is implemented using a split radix approach that uses minimum number of operations. There are several architectures possible for the radix implementation. Primarily the multiplication by the complex twiddle weight in a single radix butterfly operation can be done using three real multiplies and three real adds. It can also be achieved using a CORDIC multiplication algorithm that would leave the output of the transform scaled by a real factor. The latter has the benefit of lesser noise and fewer operations.

Prefix Addition

A cyclic prefix of 1/8 (or smaller) symbol duration will be added to the inverse FFT symbol. Consideration should be given to reducing any discontinuity in the signal due to the addition of the prefix which might happen because the last sample of the iFFT buffer might not be continuous with the first sample. This would make the signal discontinuous at the end of the prefix. In order to prevent such an occurrence, the output of the composite symbol could be filtered by a low pass filter. Since the signal exists both in time as well as frequency domain in the transmit path, such filtering can be achieved in the frequency domain by multiplication by the frequency response of the raised cosine filter. However the cyclic prefixing may need some modifications to account for the prefix discontinuity.

The extension of the symbol by 1/8 duration amounts to about 85 microseconds (500 KHz divided into 2048 channels and 1/8 of that symbol duration). Theoretically the radio can tolerate 32 microseconds of delay spread or ISI. The system may, however, tolerate lesser amounts of ISI when accounting for timing variations.

Pre-Distortion for Amplifier Non Linearity

An OFDM signal is sensitive to amplifier non linearities and since it is not peak to average ratio limited (e.g., PtoA can be any value), it can cause the power amplifier and signal power to be ineffectively used. At the output of the iFFT, the samples can have arbitrary power distributions. One way to account for such variations is to scale the peak level to a maximum value that the DAC and ADC would support. For example if those are 12 bits wide then the maximum value will be 0.9995117 or −1. Correspondingly the scaling is be represented by a 16 or 32 bit value transmitted ahead of time on a separate logical channel. This can be a field in the previous MAC packet. However such a method makes inefficient use of the dynamic range of the signal. Take as an example an iFFT symbol with one large sample but all others close to zero. Then the full range signal is used only in one sample while all others do not use more than 1 bit out of 12. An extension of this involves using a simple filter to shape the spectrum appropriately to utilize all the bits of the DAC. For example, a heuristic approach would be to use a moving average window that spans the maximum and minimum power samples locations. Thus, if these two samples are 210 indices apart then the window length is 210. Then inverting the averager at the receiver (another moving window) results in the original samples. A more sophisticated approach would use a well designed window in the frequency domain so that the time domain samples span the full dynamic range of the DAC. The actual description of the filter would be communicated on the same logical channel that carried the scaling factor. This approach can be added on top of scaling (e.g., signal scaled after averaging or filtering) so that the net result is to efficiently use the signal dynamic range.

Figure 6:
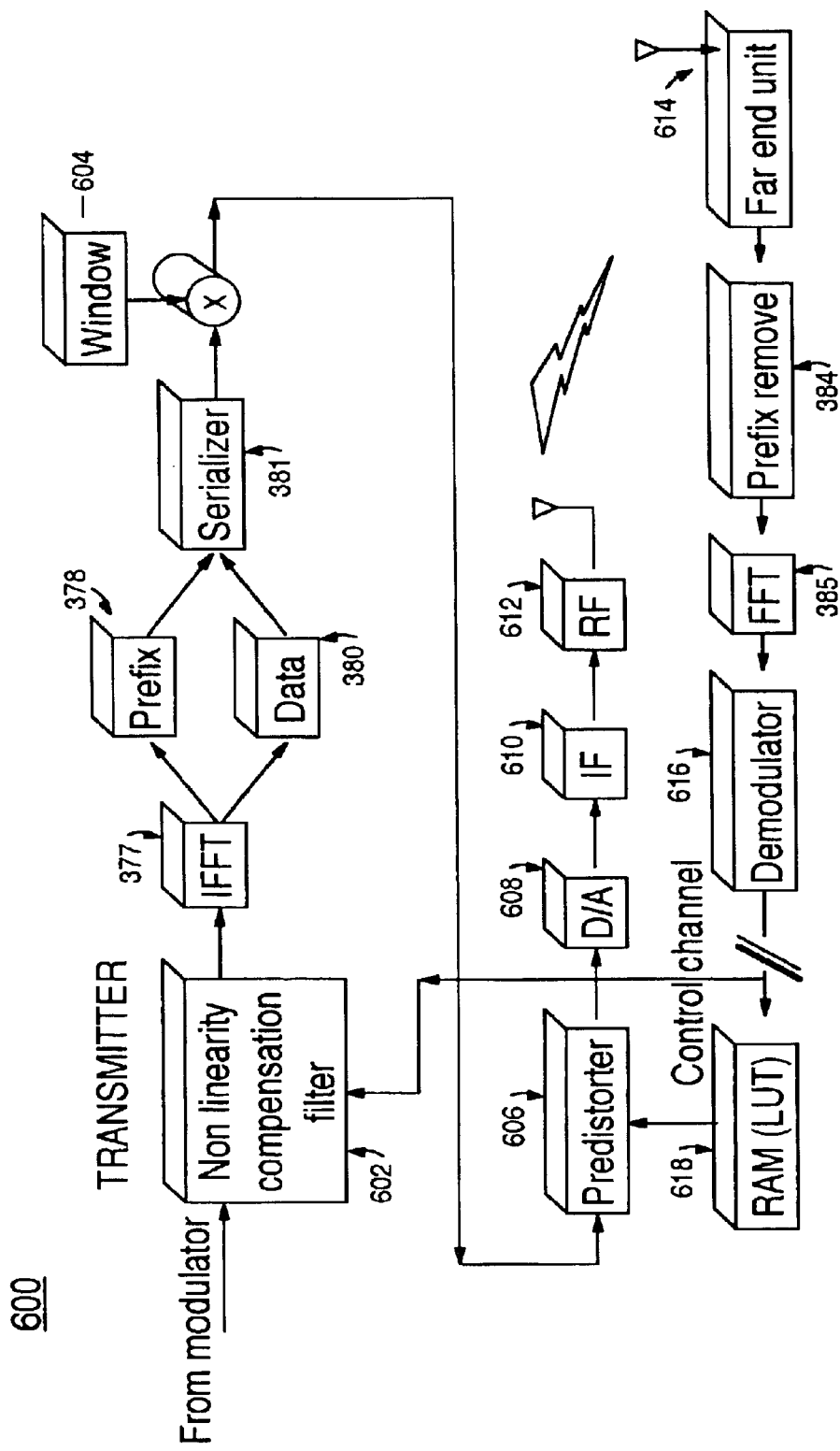
FIG. 6 is a block diagram of pre-distortion for amplifier non-linearity, according to an embodiment of the present invention.

In addition to the above algorithms, a pre-distorter (FIG. 6, 606) may be used to avoid non linearity problems of the high power amplifier. Since the amplifier characteristics change over time due to aging, temperature variations etc., a closed loop adaptive algorithm is used where by the receiving node communicates measured distortions on a control channel which would cause a RAM look up table to adaptively change entries correspondingly. Such a scheme is proven to be effective in compensating amplifier non linearities without high backoff values. FIG. 6 shows the pre-distortion block diagram 600 comprising a non-linear compensation filter 602, inverse fast Fourier transform 377, prefix adder 378, data 380, serializer 381, window 604, pre-distorter 606, D/A 608, IF 610, RF 612, far end unit 614, prefix remover 384, fast Fourier transform unit 385, demodulator 616, and RAM 618.

I/Q Modulation and DC Compensation

At least two possible ways exist to implement I/Q modulation. The combining and up-converting can be done at baseband where the complex signal is mixed with a digital tone of 1 MHz and then undersampled (aliased) using a 500 KHz DAC. Then the image at 500 KHz is filtered and the IF up-conversion and filtering takes place followed by RF. This would result in no unwanted DC bias in the output of the analog mixers and up-converters. However there is added complexity at baseband. The reverse path is similarly down-converted to IF of 1 MHz, filtered and undersampled. The digital image at 500 KHz is used followed by digital down-conversion to baseband.

The second approach involves two DAC for the real and imaginary baseband signal components. The actual combining and first stage of up-conversion is performed in analog in the IF stage. Thus a DC bias is introduced at the analog I/Q modulator or up-converter. This can be compensated for at baseband as mentioned next.

The IF mixer and up-converter introduce an unwanted DC level to the signal that has to be compensated for. The DC level may be detected through the use of test control signal that is received by the receiving node. The level may then be communicated on the reverse control channel and used in the baseband of the transmit node in a suitable compensation algorithm.

Transmit Filtering

For OFDM signaling channels (e.g. data channel) there is no issue of timing sensitivity and consequently a high order lowpass IIR filter is used. Implementation of this filter can be done in frequency domain since the signal exists both in time and frequency domains in the baseband section. Thus pre-multiplying the first twiddle factor used in the first butterfly stage of the iFFT should be performed where the coefficients of the lowpass filter frequency response are used as additional weights in the first set of butterfly computations.

I/Q Demodulation and DC Compensation

There are at least two possible ways of implementing I/Q demodulation. The IF signal is down-converted to a second stage IF carrier of 1 MHz, filtered and undersampled. The digital image at 500 KHz is used followed by digital down-conversion to baseband.

The second approach involves two ADC for the real and imaginary baseband signal components. The actual demodulation and down-conversion is performed in analog in the IF stage. Thus a DC bias is introduced at the analog I/Q demodulator or down-converter. This can be compensated for at baseband as mentioned next.

The IF mixer and down-converter introduce an unwanted DC level to signal that has to be compensated for. The DC level is detected through the use of test control signal that is received by the receiving node. The level is then communicated on the reverse control channel and used in the baseband of the transmit node in a compensation algorithm.

Receive Filtering

For OFDM signaling channels (e.g. data channel) there is no issue of timing sensitivity and consequently a high order lowpass IIR filter is used. This is the same filter that is used by the transmit section for OFDM. Implementation of this filter can be done in frequency domain since the signal exists both in time and frequency domains in the baseband section. Thus pre-multiplying the first twiddle factor used in the first butterfly stage of the iFFT should be performed where the coefficients of the lowpass filter frequency response are used as additional weights in the first set of butterfly computations.

Carrier and Timing Recovery

Both carrier and timing recovery can be done using Guard Interval Based (GIB) algorithms that are well known by those of ordinary skill in the art. GIB algorithms use the uncorrupted portion of the prefix extension (usually half the prefix is clean of ISI) and performing rather simple correlation operations. The peak power level location in time determines the timing of the OFDM symbol while its phase determines the fine frequency offset and is used by a fine AFC circuit to adjust using a digital PLL. In addition, coarse AFC is needed to initially acquire and track large changes in oscillator drifts.

Coarse AFC Design

Assume the use of a 50 ppm 2 GHz crystal as the master local oscillator. Thus, the frequency offset can be as large as 100 kHz and the combined uncorrected offset can be 200 kHz. However the transmitter can correct for its offset in the baseband after determining the offset in its receive path. Thus we only consider 100 kHz offset as the system design goal. The architecture and design pays a lot of attention to timing and frequency synchronization through the network. In one implementation, the master node in each group is frequency locked (through coarse and fine adjustments or AFC) to the LAP. All the other nodes in the group are synchronized in frequency to this master node. This is accomplished by a local Broadcast Common Control Channel (BCCC) that the master sets up which contains a frequency adjustment burst (a pilot tone arrangement). This pilot or burst is locked through the AFC loops to the rest of the network.

During reception of an OFDM symbol, the receiving node has a good frequency lock to start with due to the synchronization to the master node. During the symbol, any variations are tracked by the fine AFC loop based on the GIB algorithm.

The coarse AFC algorithm is based on a Frequency Correction symbol which is of the same duration as the OFDM symbol and also has the same length cyclic prefix. The contents of the FC symbol are a chirp signal whose frequency varies from 2 kHz to 100 kHz. However, the present invention is well-suited to other limits. By detecting this symbol and matching it to the reference FC chirp, the node can compute the initial frequency offset. The loop bandwidth of such an algorithm can be designed well in excess of 100 kHz.

Fine AFC Design

The fine AFC loop is used to track any-offset process not exceeding, for example, 2 kHz. The residual frequency error should be less than 10 Hz. The subcarrier spacing in the OFDM symbol is 3493 Hz. Hence for 64 QAM, 10 Hz offset represents a peak adjacent channel interference of $10 \times 7 \times 2/3493$ which is 0.04 in amplitude or −27.9 dB. For 16 QAM, the interference level is correspondingly −35.3 dB in power.

Thus 16 QAM is robust to 10 Hz resolution of the AFC while 64 QAM signaling would need a frequency interpolation or filtering algorithm such those described herein. The AFC meets the requirement for QPSK or QPSK easily as well.

The 10 Hz requirement can be met as follows. Since the OFDM symbol duration is 0.286 ms, detection of a 10 Hz offset using a GIB algorithm amounts to detection of a phase offset of 0.018 radians or 1.03 degrees. This represents signal detection at −34.9 dB. The GIB algorithm provides a processing gain of 21 dB. Hence at the least operational S/N of 14 dB at the demodulator, we have a noise floor at −35 dB and hence the 10 Hz offset can be detected and corrected by the fine AFC as long as several OFDM symbols are processed to get a further reduction of noise. The AFC can also utilize a single bit quantizer to simplify the correlation operations. This is so because the quantization noise is effective only if the signal level is smaller than the LSB of the quantizer. Since the ADC is assumed to have 12 bit or 10 bit range, and the signal is designed to utilize all the bits in the quantizer, at the smallest amplitude constellation point, in 64 QAM, we still have 6 or 4 bits room which implies −36 or −24 dB quantization noise. This is sufficiently small and can be ignored considering the fact that the 21 dB processing gain of the AFC applies to this as well.

The GIB algorithm correlates the good ISI free part of the prefix extension with the rest of OFDM symbol. Since roughly half the prefix extension can be assumed ISI free, this translates to a correlation length of $\frac{1}{16}$ symbol or 128 samples (assuming output of receiver matched filter that represents the optimum sample per time symbol duration). Averaging over 128 samples represents a 21 dB processing gain.

Timing Recovery

The OFDM symbol clock is estimated from a GIB correlator that operates on the pilot chirp (Frequency Correction) symbol and estimates the location of the prefix through the correlation. Since the symbol duration is sufficiently long and the prefix duration correspondingly long that the system is not very sensitive to timing jitters. However the delay spread incurred through each hop could reduce the margin for the jitter. Also working against that margin is the AFC loop timing since it assumes a certain duration of available ISI free prefix duration. This subsection describes the GIB timing algorithm. It should be noted that this is similar to the GIB AFC algorithms.

Adaptive Equalization

Figure 8:
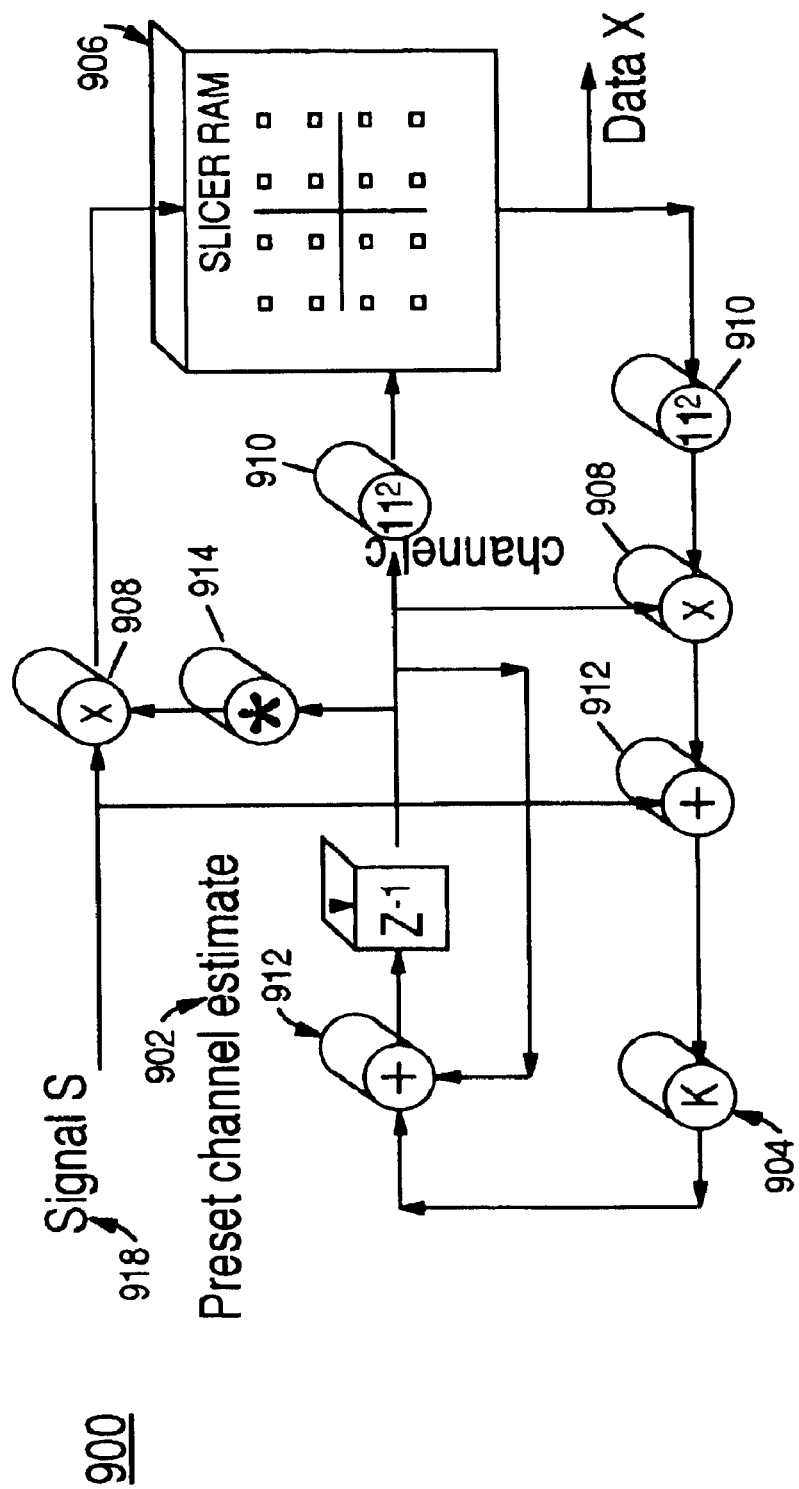
FIG. 8 is a block diagram of an adaptive equalization algorithm, according to an embodiment of the present invention.

Because of the use of OFDM with 3493 Hz frequency channels, only a one tap LMS adaptive equalizer is needed per channel which would equalize the flat fading incurred in the channel. Thus a single complex multiplier should suffice which implies 3 real multiplies and 5 real additions. However the LMS gradient weight update needs a complex division which is significantly more expensive than multiplication and also is a source of additional noise in the signal processing path. A significant improvement over this method is to rotate and scale the slicer which is easy since the decision boundaries are multiples of 2. For instance in 16 QAM the decision boundary is +/−2 in each dimension while in 64 QAM it is +/−2 or 4 in each dimension. The algorithm 900 is shown in block form in FIG. 8. The initial channel estimates 902 are complex values that are stored in RAM (one entry per channel) and loaded or updated appropriately. The adaptation loop for updating the gradient weight has a gain K 904 inserted that can take a single value or change as Kalman filter coefficients thereby making the adaptation more RLS than LMS. In one embodiment, a single value constant is used. The scaling of the output of the slicer 906 is only conceptually needed since the scaled value is internally stored in the slicer RAM. Thus, the algorithm 900 needs two complex multiplies 908, one magnitude squared 910, slicer multiplications (register shifts due to power of 2 boundaries), one complex scale 914 and two complex additions 912. The algorithm 900 inputs signal 918.

Logical and Physical Channel Structure

The physical channel in the system comprises of a number of frequency bands (B) occupied for a specific time duration (T). By spatial re-use through interference rejection on the data channel, the BT resource is further divided into more resources. For example, signals can be transmitted to multiple users operating at the same carrier frequency at the same time. In addition to data channels, there may be control channels and link setup channels.

Broadly, control channels are used for node power up, link setup, MAC reservation, frequency acquisition and correction, phase coherence, signal quality (or channel) estimation which may include sub carrier fading data, non linearity pre-distortion data, channel estimation etc., channel training sequences, timing adjustment, power level settings, modulation order determination, co channel interference determination and parameters for interference cancellation/excision, group membership protocols, master node related protocols, IAP related parameters, etc.

Under each of the above procedures, there are several supporting control channels as listed below.

I) Node Power Up Procedures include:
  Dedicated Authentication Channel (DACH)
  Grant of Access Channel (GACH)
  Secure Private Information Channel (SPICH)

II) Link Setup Procedures include:
  Service Request Channel (SeRCH)
  Service Grant Channel (SeGCH)

The IAP and master nodes assist these protocols by broadcasting service types available (QoS available) which is done on the SeACH (Service Availability Channel).

III) MAC Reservation Protocols include:
  Wavelet Reservation Channel (WaRCH) which can be subdivided into
  WaRCH2, WaRCH4, WaRCH8, WaRCH16, WaRCH32, WaRCH64,
  WaRCH128, WaRCH256, WaRCH512 and WaRCH1024 corresponding to the number of nodes involved in the reservation process.
  Service Grant Channel (SeGCH)

Synchronous channel (SCO) reservations are performed differently than ACL reservations. The basic operation of SCO reservations starts with the CPE 206 making a request to its local master (local group), indicating the bandwidth that is needed and the QoS in terms of latency. Subsequently the master node sends the request to the IAP which then updates the broadcast control channel SeACH with the new start address for ACL links. The CPE 206 and master (thereby all the group nodes) note this update and after three consecutive updates, the new link is assumed to be created by all the nodes. The present invention is well-suited to other numbers of consecutive updates. The IAP also updates the maximum allowable resource demands that can be made by each CPE 206. Due to the different QoS and bandwidth demands by the various CPE 206, this maximum limit is determined and transmitted in the form of a uniform scaling factor that scales the demands of each CPE 206 back. Thus if the SCO allocations occupy half the resources and therefore leaving only half to the ACL links, then the scale factor is 0.5, e.g., each ACL CPE 206 scales the reservation demand by half. A maximum limit may be set for the SCO bandwidth. This may be a service provider programmable parameter of the network.

When an SCO link is terminated under normal procedures, the IAP indicates the update to all the master nodes and thereby all CPE 206 also. Since the SCO could have occupied any block of resources, the update information on the SeACH channel packets may consist of: 1) an address pointer that signifies where the resource allocation changes should be made, and 2) the number of channel resources released.

When the SCO using CPEs 206 detect these parameters, and if its affects their allocations (e.g., they occupy resources that have higher indices than the CPE 206 that finished with the link) they will shift their resources accordingly. For example if there are 1024 resources (frequency and time combinations or wavelets) for the SCO links and if a CPE 206 occupying 512 through 531 wavelets finishes its SCO link, then CPEs 206 using links that occupy resources 532 through 1023 will, after the update, occupy 512 through 1003 and thus there will be 1004 wavelets dedicated to SCO links in the stream.

In one embodiment, three SeACH updated packets may have to go by the network before the CPEs 206 involved would change their allocations.

In addition to the SCO and ACL links, there is an allocation in the network for broadcast traffic. It is envisaged that such traffic would be composed of static web content, community broadcasting of local events, news, etc. The amount of allocation to broadcast traffic, if any, is a service provider controlled parameter. Thus the stream based resource line is subdivided into three categories.

Frequency, Phase Acquisition and Tracking include a frequency correction burst packet (FCB) which is generated by the master of each group. Since each master in turn is synchronized in frequency to the IAP all the CPE 206 involved with the IAP have a common frequency reference and are synchronized with the network. The FCB bursts occur in periodic intervals that is determined by the IAP timers. However since multiple masters broadcast these packets, each CPE 206 will receive the intended and unintended FCB as well which will cause additional constant phase shifts in the control signal. These phase shifts are easily handled by the CPE 206 since the constant phase is inconsequential to the operations. However amplitude variations in the FCB makes it unusable for power level measurements for reception from the master of the group.

Phase coherence acquisition procedures include basically a equalizer training signal. Because of the coherence needs of the group during cooperative beamforming, the repeating CPE 206 need to be equalizing the received signal before retransmitting. This implies that the CPE 206 initially acquire the channel estimate. The broadband nature of the signal complicates the training sequence by requiring it to be wideband as well. This is due to the frequency selective fading that occurs in the channel. Thus the equalizer has to train on multiple repeated sub carriers.

The duration between equalizer training sequences is a service provider programmable parameter since some groups will need faster rate of equalization due to more rapid channel variations. The default coherence time in the channel is assumed to be 25 milliseconds (corresponding to a maximum Doppler spread of 40 Hz). The training sequence is a special OFDM symbol that is transmitted by the source group (1 ms duration) every 25 OFDM symbols. Since a transmitting group would consist of more than one CPE 206 (up to 10 CPE 206 depending on the density of nodes), the level crossing rates of fading at the various repeated sub carriers is lesser than that due to a single CPE 206 alone (assuming independent fading for each transmitting CPE 206).

Signal quality estimation procedures include communication of a number of system parameters. One of the keys to efficient operation of the system is to determine if repeating nodes are effective. There could be several reasons why a node that was contributing significant power to the destination group at one time, becomes ineffective at a later time.

Figure 15:
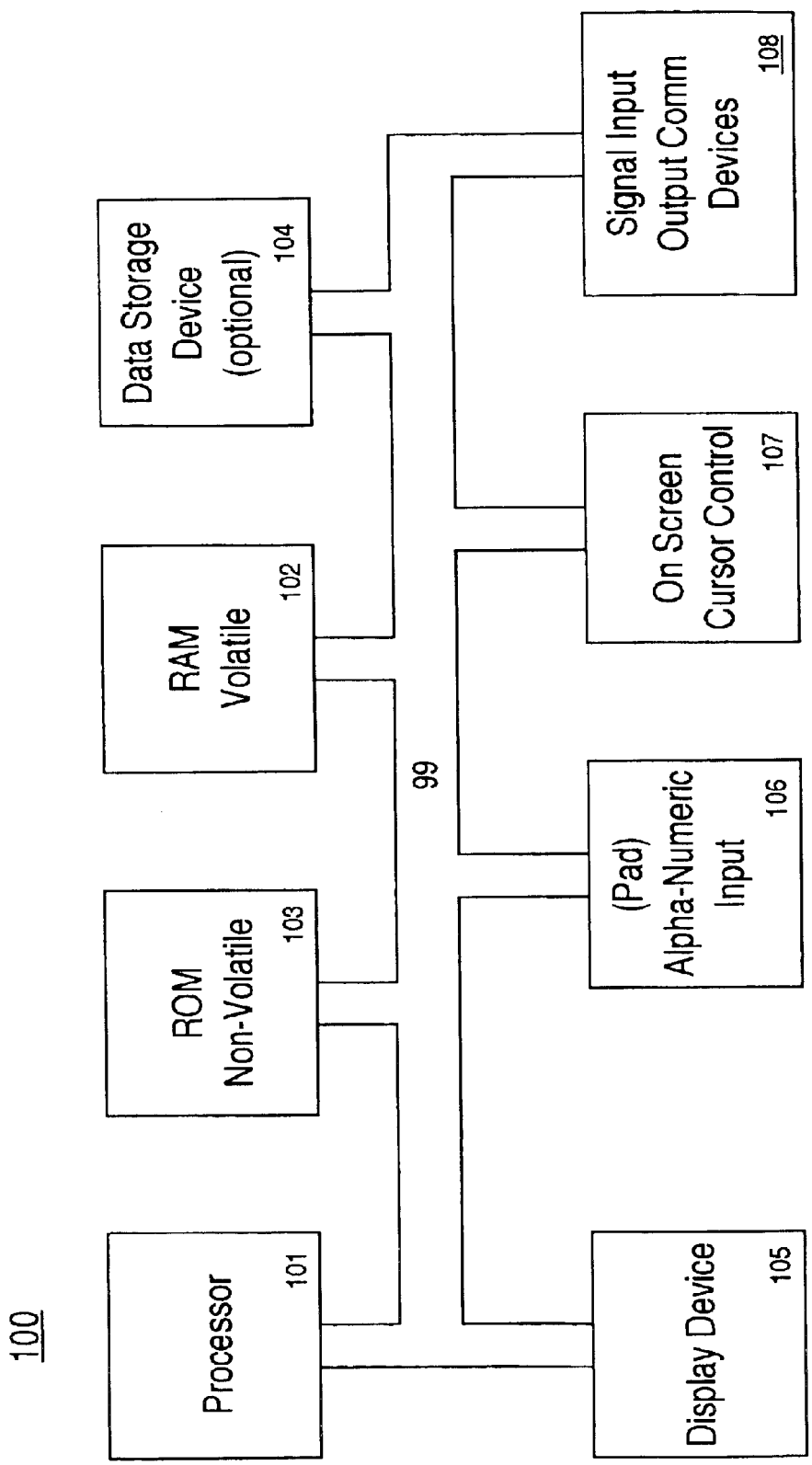
FIG. 15 is a schematic diagram of an exemplary computer system upon which the portions of the present invention may be practiced, in accordance with embodiments of the present invention.
Figure 16:
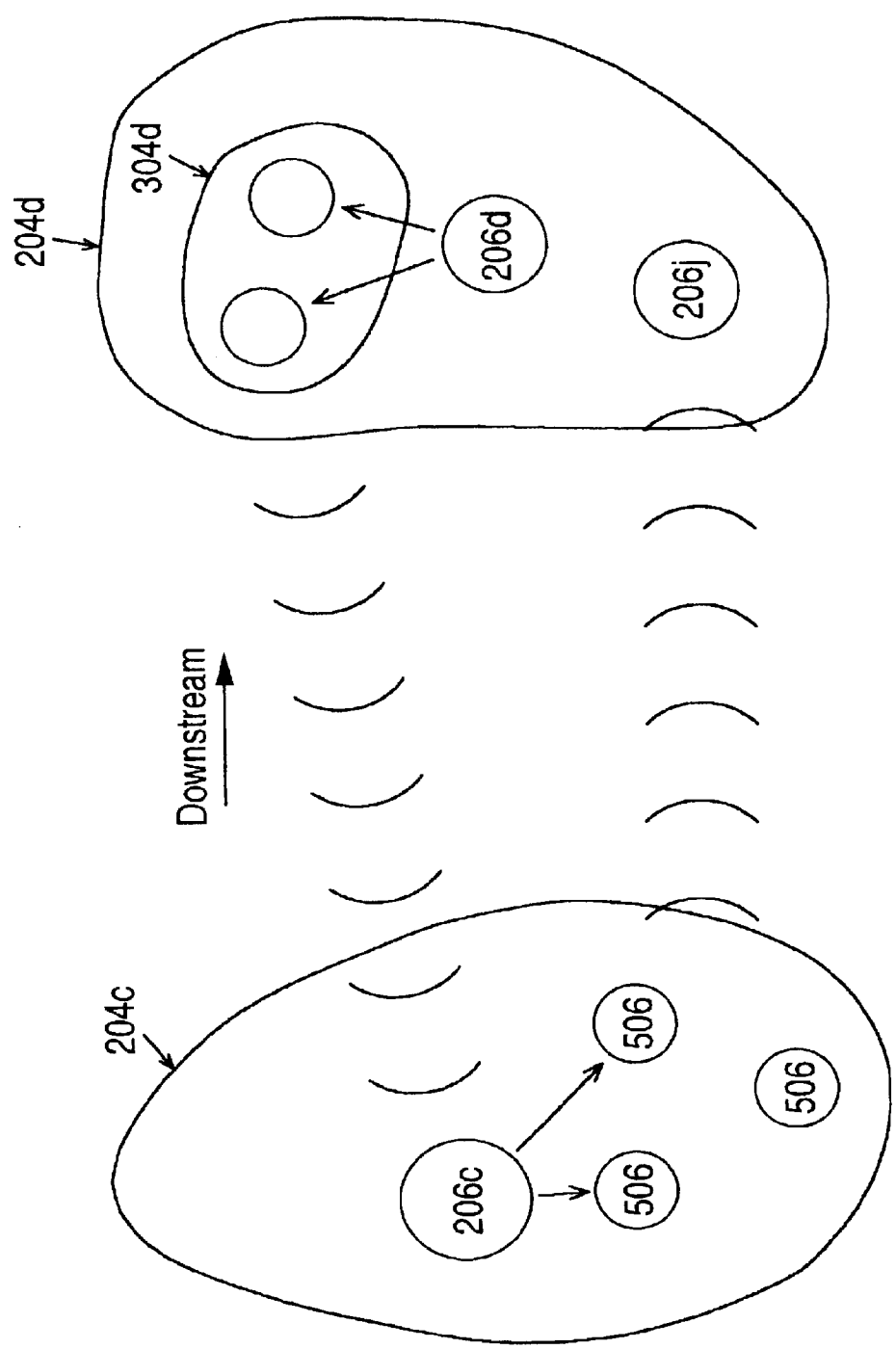
FIG. 16 is a diagram illustrating how data flowing upstream is beamformed to an upstream facing node, according to embodiments of the present invention.

With reference now to FIG. 15, portions of the present method and system for using clustered networks of receivers/transmitters to coherently repeat a signal to a downstream receiver are comprised of computer-readable and computer-executable instructions which reside, for example, in computer-usable media of a computer system. FIG. 15 illustrates an exemplary computer system 100 used to perform the method in accordance with one embodiment of the present invention. It is appreciated that system 100 of FIG. 15 is exemplary only in that the present invention can operate within a number of different computer systems including general purpose networked computer systems, embedded computer systems, and stand alone computer systems. Additionally, computer system 100 of FIG. 15 is well adapted having computer readable media such as, for example, a floppy disk, a compact disc, and the like coupled thereto. Such computer readable media is not shown coupled to computer system 100 in FIG. 15 for purposes of clarity.

System 100 of FIG. 15 includes an address/data bus 99 for communicating information, and a central processor unit 101 coupled to bus 99 for processing information and instructions. Central processor unit 101 may be an 80×86-family microprocessor. System 100 also includes data storage features such as a computer usable volatile memory 102, e.g. random access memory (RAM), coupled to bus 99 for storing information and instructions for central processor unit 101, computer usable non-volatile memory 103, e.g. read only memory (ROM), coupled to bus 99 for storing static information and instructions for the central processor unit 101, and a data storage unit 104 (e.g., a magnetic or optical disk and disk drive) coupled to bus 99 for storing information and instructions.

With reference still to FIG. 15, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A network interface card (NIC) 108 coupled to bus 99 is connected to a network and controls the flow of information over the network.

Therefore, it will be seen that embodiments of the present invention allow a method and system for using clustered networks of receivers/transmitters to coherently repeat a signal to a downstream receiver. Embodiments of the present invention allow for method and system which is well-suited for a scattering environment. Embodiments of the present invention allow for method and system do not require large numbers of antennas at each node. Furthermore, embodiments of the present are scaleable and suitable for multiple users at high bit rates. Embodiments of the present invention have better fading characteristics than conventional systems and can reach nodes at poor reception sites.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for wireless transmission of a signal comprising:
   a base node operable to transmit a plurality of signals over the same channel;
   a first plurality of nodes in proximity to said base node such that said base node functions as a distributed source to each node of said first plurality and said plurality of signals arrive at said first plurality of nodes as co-channel interferers, wherein each of said first plurality of nodes is operable to distinguish between said plurality of signals arriving at said first plurality of nodes as co-channel interferers;
   said first plurality of nodes further operable to transmit a corresponding plurality of repeated signals which combine to substantially cancel out said co-channel interference at a destination node, wherein said destination node receives a signal substantially free of co-channel interference.

2. The system of claim 1 wherein said base node is further operable to determine a combination of a desired signal and at least one interfering signal for each of said plurality of signals, said determination based upon the channel characteristics between said base node and said destination node, such that when said plurality of signals are received at said destination node said at least one interfering signal substantially cancels out leaving substantially only said desired signal.

3. The system of claim 1 wherein said first plurality of nodes are further operable to determine a combination of a desired signal and at least one interfering signal for each of said plurality of signals, said determination based upon the channel characteristics between said first plurality of nodes and said destination node, such that when said plurality of signals are received at said destination node said at least one interfering signal substantially cancels out leaving substantially only said desired signal.

4. The system of claim 1 wherein said first plurality of nodes comprises a first group of nodes and a second group of nodes, said plurality of signals comprises a first signal and a second signal, and said first group of nodes repeats said first signal and said second group of nodes repeats said second signal.

5. The system of claim 4 wherein said first group of nodes receives said first signal at a higher power level than said second signal.

6. The system of claim 4 wherein said first group of nodes receives said first signal at a different phase than said second signal.

7. The system of claim 4 wherein said first group of nodes substantially rejects said second signal.

8. The system of claim 4 wherein said first group of nodes is operable to coherently repeat said first signal such that when received at a first destination node said first signal is substantially free of interference from said second signal, and said second group of nodes is operable to coherently repeat said second signal such that when received at a second destination node said second signal is substantially free of interference from said first signal.

9. The system of claim 1 wherein said first plurality of nodes are further operable to place a null at a selected node, wherein interference at said selected node is substantially eliminated.

10. The system of claim 1 wherein said first plurality of nodes comprises a master node operable to broadcast a control signal, and wherein a second node of said first plurality of nodes is operable to form a group with said master node based upon the strength of said control signal when received by said second node.

11. The system of claim 1 further comprising a second plurality of nodes operable to receive a plurality of signals from said first plurality of nodes and to each transmit a corresponding plurality of repeated signals which when received at said destination node combine to substantially cancel out co-channel interference.

12. The system of claim 11 wherein said first plurality of nodes are operable to communicate with said second plurality of nodes by adaptive beamforming to a master node in said second plurality of nodes.

13. The system of claim 11 wherein said first plurality of nodes of nodes appear as a distributed source to a node in said second plurality of nodes.

14. The system of claim 11 wherein the dimension of said first plurality of nodes is substantially similar to the distance between said first plurality of nodes and said second plurality of nodes, wherein a node in said second plurality of nodes is operable to distinguish between said signals transmitted by said first plurality of nodes.

15. The system of claim 1 wherein the distance between two of said nodes in said first plurality of nodes relative to the distance to said destination node is such that selective frequency fading is substantially eliminated at said destination node, wherein transmitter diversity is provided.

16. The system of claim 1 wherein said first plurality of nodes are further operable to repeat a desired signal to a destination node over a plurality of frequencies that are separated apart sufficiently in frequency such that selective frequency fading at said destination node happens independently over said plurality of frequencies, wherein the magnitude of required fade margins is substantially reduced.

17. A method of communicating within a network of nodes comprising:
   a) dividing said network of nodes into a plurality of groups of nodes;
   b) determining a signal comprising a desired signal and a plurality of interference signals which when transmitted to a destination node will emphasize said desired signal and substantially cancel said plurality of interference signals;
   c) broadcasting said signal to a first group of said plurality of groups;
   d) a plurality of nodes in said first group each repeating said signal such that said signal is coherently combined; and
   e) said destination node receiving said repeated signals, wherein said desired signal is emphasized and said plurality of interference signals are substantially canceled.

18. The method of claim 17 wherein said step a) comprises the steps of:

a1) a first node in said network of nodes broadcasting a control signal;

a2) a second group of nodes in said network of nodes each receiving said control signal;

a3) each node of said second group of nodes determining if the strength of said control signal is above a threshold; and a4) those nodes in said step a3) for which said signal is above said threshold forming said first group of said plurality of groups with said first node.

19. The method of claim 17 further comprising the step of:

f) forming a sub-group within said first group of said plurality of groups such that each node of said sub-group receives a first destination signal at a stronger power than a second destination signal.

20. The method of claim 19 wherein said step d) comprises the step of:

d1) said nodes in said sub-group rejecting a portion of said interference signal.

21. The method of claim 17 further comprising the step of:

f) forming a sub-group within said first group of said plurality of groups such that each node of said sub-group receives a first destination signal at a substantially different phase than a second destination signal.

22. The method of claim 21 wherein said step d) comprises the step of:

d1) said nodes in said sub-group placing a null at a selected node, wherein an interference signal at said selected node is substantially eliminated.

23. The method of claim 17 wherein said step b) comprises the step of:

b1) determining characteristics of the channel to said destination node.

24. The method of claim 17 further comprising the step of:

f) broadcasting a plurality of signals at the same frequency at the same time to said first group of said plurality of groups, wherein geographically separate nodes are able to receive and decode individual signals with substantially low interference.

25. The method of claim 17 further comprising the step of:

f) monitoring the contribution of a node to said coherently combined signal received at said destination node.

26. A system for wireless transmission of a signal comprising:

a transmitting node operable to transmit a plurality of signals at the same frequency and at the same time;

a first plurality of nodes in proximity to said transmitting node such that said plurality of signals arrive at said first plurality of nodes as co-channel interferers and wherein each of said first plurality of nodes is operable to distinguish between said plurality of signals arriving at said first plurality of nodes;

said first plurality of nodes further operable to cooperatively beamform a signal of said plurality of signals to a destination node, wherein said co-channel interference cancels at a destination node and a desired signal is emphasized.

27. The system of claim 26 wherein said first plurality of nodes are operable to communicate with a second plurality of nodes by establishing an beamformed link.

28. The system of claim 27 wherein said beamformed link is adaptive.

29. The system of claim 27 wherein said first plurality of nodes are in a scattering environment.

30. The system of claim 27 wherein said signal is a radio frequency signal.

31. The system of claim 27 wherein said beamforming takes place in the near field.

32. The system of claim 27 wherein said beamforming takes place in the far field.

33. A method of communicating within a network of nodes comprising:

a) dividing said network of nodes into a plurality of groups, wherein each group comprises a plurality of nodes with one of said plurality of nodes a master node;

b) determining a signal comprising a desired signal and a plurality of interference signals which when transmitted to a destination node will emphasize a desired signal and substantially cancel said plurality of interference signals;

c) a group master node in a first group of said plurality of groups broadcasting said signal to a plurality of repeater nodes in its group; and d) said repeater nodes in said first group each repeating said signal to beamform said signal, wherein said signal arrives at a desired node at a peak of said signal and said signal arrives at an undesired node at a null of said signal.

34. The method of claim 33 further comprising the steps of:

e) repeating said step c) and said step d) to transmit said signal from group to group.

* * * * *